US012683287B2

(12) United States Patent
Zhang et al.

(10) Patent No.: US 12,683,287 B2
(45) Date of Patent: Jul. 14, 2026

(54) 3D PRINTED REFLECTING SURFACE FOR MILLIMETER-WAVE COVERAGE EXPANSION

(71) Applicant: The Regents of the University of California, Oakland, CA (US)

(72) Inventors: Xinyu Zhang, San Diego, CA (US); Kun Qian, San Diego, CA (US); Tse Nga Ng, San Diego, CA (US); Lulu Yao, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 56 days.

(21) Appl. No.: 18/913,945

(22) Filed: Oct. 11, 2024

(65) Prior Publication Data

US 2025/0125533 A1 Apr. 17, 2025

Related U.S. Application Data

(60) Provisional application No. 63/589,543, filed on Oct. 11, 2023.

(51) Int. Cl.
*H01Q 15/14* (2006.01)
*G02B 27/09* (2006.01)

(52) U.S. Cl.
CPC .................................... *H01Q 15/14* (2013.01)

(58) Field of Classification Search
CPC ........ H01Q 15/14; H01Q 15/148; H01Q 3/46; H04B 7/04; H04B 7/04013; G02B 27/09; G02B 27/10; G02B 27/42
See application file for complete search history.

(56) References Cited

U.S. PATENT DOCUMENTS

| | | | | |
|---|---|---|---|---|
| 11,275,252 | B2 * | 3/2022 | Boriskin | G02B 27/0927 |
| 12,235,464 | B2 * | 2/2025 | Shramkova | G02B 27/095 |
| 12,444,851 | B2 * | 10/2025 | Rafique | H01Q 15/148 |
| 12,463,347 | B1 * | 11/2025 | Leung | H01Q 15/0086 |
| 12,519,509 | B2 * | 1/2026 | Zuo | H04B 7/04013 |
| 12,531,601 | B2 * | 1/2026 | Khaira | H04B 7/04013 |

OTHER PUBLICATIONS

3D Systems VisiJet M3 Crystal (MJP), (Available at https://www.3dsystems.com/materials/visijet-m3-crystal) 2 pages.

(Continued)

*Primary Examiner* — Tho G Phan
(74) *Attorney, Agent, or Firm* — FisherBroyles, LLP

(57) ABSTRACT

In some embodiments, there is provided an apparatus for reflecting at least one millimeter wave beam, the apparatus includes a metasurface configured with a plurality of metal-backed dielectric cuboids, wherein each of the metal-backed dielectric cuboids includes a dielectric material having a first surface of the dielectric material and an opposite, second surface of the dielectric material, wherein the first surface of the dielectric material is in a same plane as the second surface of the dielectric material, wherein the dielectric material comprises a cuboid defined at least by a width and a thickness, and a metal layer having a first surface of the metal layer and an opposite second surface of the metal layer, wherein the second surface of the dielectric material is disposed on the first surface of the metal layer.

19 Claims, 12 Drawing Sheets

(56) References Cited

OTHER PUBLICATIONS

Abari, O. et al., "Enabling {high-quality} untethered virtual reality." In 14th USENIX Symposium on Networked Systems Design and Implementation (NSDI 17) (pp. 531-544).
Agnoletto, F. et al., "The economics of mmWave 5G An assessment of total cost of ownership in the period to 2025." GSMA Intelligence 11 (2021).
Airfide, a 5G Software Company, (Available at https://airfidenet.com/), 2021.
Alkhateeb, A. et al., "Deep learning coordinated beamforming for highly-mobile millimeter wave systems." IEEE access 6 (2018): 37328-37348.
Amer, A.A.G. et al., "A comprehensive review of metasurface structures suitable for RF energy harvesting." IEEE Access 8 (2020): 76433-76452.
Andersson, S. et al., "Design considerations for 5G mm-wave receivers." 2017 Fifth International Workshop on Cloud Technologies and Energy Efficiency in Mobile Communication Networks (Cleen). IEEE, 2017.
Anritsu. [n. d.] "Making EIRP Measurements on 5G Base Stations." (Available at https://dl.cdn-anritsu.com/en-us/test-measurement/files/Application-Notes/Application-Note/11410-01160A.pdf).
Arun, V. et al., "RFocus: Beamforming using thousands of passive antennas." 17th USENIX symposium on networked systems design and implementation (NSDI 20). 2020, pp. 1047-1061.
Asadchy, V.S. et al., "Flat engineered multichannel reflectors." Physical Review X 7.3 (2017): 031046.
Aubry, A. et al., "Reconfigurable Intelligent Surfaces for N-LOS Radar Surveillance." arXiv preprint arXiv:2104.00456 (2021).
Badloe, T. et al., "Metasurfaces-based absorption and reflection control: perfect absorbers and reflectors." Journal of Nanomaterials 2017.1 (2017): 2361042.
Balanis, A. C., 2016. Antenna theory: Analysis and Design. Wiley.
Bel Kamel, E. et al., "RCS modeling and measurements for automotive radar applications in the W band." In 2017 11th European Conference on Antennas and Propagation (EUCAP) (pp. 2445-2449).
Berranger, J. "Volcano 5G: Siradel announces enhanced version of its Volcano propagation model!" (Available at https://www.siradel.com/volcano-5g-siradel-announces-enhanced-version-of-its-volcano-propagation-model/), 1 page.
Berry, D. et al., "The reflectarray antenna." IEEE Transactions on Antennas and Propagation 11.6 (1963): 645-651.
Bindra, P. et al., "Fundamental aspects of electroless copper plating." Electroless Plating Fundamentals & Applications (Jan. 1990) pp. (1990): 289-375.
Boyarsky, M. et al., "Electronically steered metasurface antenna." Scientific reports 11.1 (2021): 4693.
Chaimool, S. et al., "Experiment of a phase-gradient metasurface reflector for millimeter wave and 5G applications." 2022 16th European Conference on Antennas and Propagation (EuCAP). IEEE, 2022.
Chen, B-J. et al. "3D printed reflectarray antenna at 60 GHZ." 2016 International symposium on antennas and propagation (ISAP). IEEE, 2016. (pp. 92-93).
Chen, L. et al., "Pushing the Physical Limits of {IoT} Devices with Programmable Metasurfaces." 18th USENIX Symposium on Networked Systems Design and Implementation (NSDI 21). 2021.
Cho, K.W. et al., "mmWall: A reconfigurable metamaterial surface for mmWave networks." Proceedings of the 22nd International Workshop on Mobile Computing Systems and Applications. 2021 (pp. 118-124).
Cong, Y. et al., "A pattern synthesis method for large planar antenna array." Progress in Electromagnetics Research M 43 (2015): 147-156.
Costa, F. et al., "Closed-form analysis of reflection losses in microstrip reflectarray antennas." IEEE transactions on antennas and propagation 60.10 (2012): 4650-4660.
Costa, F. et al., "Electromagnetic model of reflective intelligent surfaces." IEEE Open Journal of the Communications Society 2 (2021): 1577-1589.
CrownCastle. 2022. Small Cells. (Available at https://www.crowncastle.com/infrastructure-solutions/small-cells.) (2022) 5 pages.
D'Auria, M. et al., "3-D printed metal-pipe rectangular waveguides." IEEE Transactions on Components, Packaging and Manufacturing Technology 5.9 (2015): 1339-1349.
Dai, L. et al., "Reconfigurable intelligent surface-based wireless communications: Antenna design, prototyping, and experimental results." IEEE access 8 (2020): 45913-45923.
Davenport, C.J. et al., "Slanted-comb frequency selective surface for use in reducing specular scatter for TM polarization." 2014 Loughborough Antennas and Propagation Conference (LAPC). IEEE, 2014.
Deffenbaugh, P.I. et al., "Fabrication and microwave characterization of 3-D printed transmission lines." IEEE Microwave and wireless components letters 25.12 (2015): 823-825.
Dehkordi, S.K. et al., "Making Vulnerable Road Users More Visible to Radar: A Communications Inspired Approach." 2021 21st International Radar Symposium (IRS). IEEE, 2021.
Díaz-Rubio, A. et al., "From the generalized reflection law to the realization of perfect anomalous reflectors." Science advances 3.8 (2017): e1602714.
Dubey, S.K. et al., "Digitally controlled steered dual beam pattern synthesis of a rectangular planar array antenna in a range of azimuth plane using evolutionary algorithms." Progress in Electromagnetics Research C 114 (2021): 185-202.
Dunna, M. et al., "ScatterMIMO: Enabling virtual MIMO with smart surfaces." Proceedings of the 26th Annual International Conference on Mobile Computing and Networking. 2020.
Elahi, M. et al., "A wideband reflectarray antenna for satellite application with low cross-polarization." Applied Sciences 13.7 (2023): 4545.
Elfrgani, A.S. et al., "Near-field RCS for automotive radar applications." 2019 International Workshop on Antenna Technology (iWAT). IEEE, 2019.
Encinar, J.A. "Design of two-layer printed reflectarrays using patches of variable size." IEEE Transactions on Antennas and Propagation 49.10 (2001): 1403-1410.
Fang, N. et al., "Sub-diffraction-limited optical imaging with a silver superlens." science 308.5721 (2005): 534-537.
FierceWireless. 2021. Verizon adds 4 more mmWave cities, expands 5G Home service. (2021). (Available at https://www.fiercewireless.com/wireless/verizon-adds-4-more-mmwave-cities-expands-5g-home-service) 3 pages.
Flowers, B. et al., "Low Overhead Codebook Design for mmWave Roadside Units Placed at Smart Intersections." In 2021 IEEE 32nd Annual International Symposium on Personal, Indoor and Mobile Radio Communications (PIMRC) (pp. 366-372). IEEE, 2021.
Fonteneau, C. et al., "A systematic beam broadening method for large phased arrays." In 2021 Joint European Conference on Networks and Communications & 6G Summit (EuCNC/6G Summit) (pp. 7-12). IEEE, 2021.
FreeMapTools. [n. d.]. Elevation Finder. ([n. d.]). (Available at https://www.freemaptools.com/elevation-finder.htm) 2 pages.
Gao, D. et al., "Meta-surface based convex reflectors for generating highly directive pencil-beams and fan-beams." Optical Materials Express 8.5 (2018): 1359-1367.
Ge, X. et al., "5G wireless backhaul networks: challenges and research advances." IEEE network 28.6 (2014): 6-11.
Giordani, M. et al., "A Tutorial on Beam Management for 3GPP NR at mmWave Frequencies." arXiv preprint arXiv:1804.01908 (2018).
Google. [n. d.]. Maps. ([n. d.]). (Available at https://www.google.com/maps/).
Google. [n. d.]. speedtest. ([n. d.]). (Available at https://www.google.com/search?q=speedtest&rlz=1C1ONGR_enUS965US965&oq=speedtest&aqs=chrome.0.69i59j0i433i512j46i433i512j46i175i199i433i512j0i433i512j69i61j69i60l2.1088j0j4&sourceid=chrome&ie=UTF-8), 1 page.
Gros, J-B. et al., "A reconfigurable intelligent surface at mmWave based on a binary phase tunable metasurface." IEEE Open Journal of the Communications Society 2 (2021): 1055-1064.

(56) References Cited

OTHER PUBLICATIONS

Hand, T.H., et al., "Characterization of complementary electric field coupled resonant surfaces." Applied Physics Letters 93.21 (2008).
Hannan, S. et al., "Wide bandwidth angle-and polarization-insensitive symmetric metamaterial absorber for X and Ku band applications." Scientific Reports 10.1 (2020): 10338.
Hardesty, L. [n. d.]. Verizon, Ericsson, Qualcomm hit 5G peak speed of 5 Gbps in test.([n.d.]). (Available at https://www.fierce-network.com/5g/verizon-ericsson-qualcomm-hit-5g-peak-speed-5-gbps-test.) 3 pages.
Haupt, R.L. "Antenna arrays: a computational approach." John Wiley & Sons, 2010.
Heath, R.W. "Going toward 6G [from the editor]," IEEE Signal Process. Magazine, 36:3, 2019, 2 pages.
Hongnara, T. et al., "Dual-polarized broad-beam reflective metasurface based on multi-sheet configuration for local 5G application at 28.25 GHz." 2021 15th European Conference on Antennas and Propagation (EuCAP). IEEE, 2021.
HP, HP 3D High Reusability PA-12 MJF. (Available at https://www.hp.com/go/3DMaterials, 2 pages.
Huang, C. et al., "Holographic MIMO surfaces for 6G wireless networks: Opportunities, challenges, and trends." IEEE wireless communications 27.5 (2020): 118-125.
Huang, Y. "Antennas: from theory to practice." John Wiley & Sons, 2021.
Hwang, R.B. "Scattering characteristics of two-dimensionally periodic impedance surface." IEEE Transactions on Antennas and Propagation 48.10 (2000): 1521-1527.
Intel. 2022. RFID Wet Inlays. (2022). (Available at https://www.intel.com/content/www/us/en/products/docs/wireless-products/wigig-overview.html#:-:text=Intel%C2%AE%20WiGig%20operates%20on,cord%20without%20compromising%20video%20quality) 5 pages.
Isola group. 2022. Astra MT77. (Available at https://www.isola-group.com/pcb-laminates-prepreg/astra-mt77-laminate-and-prepreg/. (2022) 4 pages.
Jeffs, J. Dec. 7, 2021. "Three Reasons Radar is Critical for the Future of Mobility." (Available at https://www.idtechex.com/journal/print-articles.asp?articleids=25442.) 4 pages.
Kawecki, R. et al., "Performance of fingerprinting-based indoor positioning with measured and simulated RSSI reference maps." Remote Sensing 14.9 (2022): 1992.
KEYCOM, "Frequency change Method, Free Space Type Dielectric Constant, Dielectric Loss Tangent, Transmission Attenuation (Permittivity, Dk/Df) Measurement equipment," (Availale at https://www.keycom.co.jp/eproducts/dps/dps 10/page.html), 2021.
Khalaj-Amirhosseini, M. "Phase-only synthesis of planar arrays using autocorrelation matching method." International Journal of RF and Microwave Computer-Aided Engineering 30.5 (2020): e22153.
Khawaja, W. et al., "Coverage enhancement for NLOS mmWave links using passive reflectors." IEEE Open Journal of the Communications Society 1 (2020): 263-281.
Kinney, S. 2020. "Densifying mmWave 5G while managing deployment costs." (Available at https://www.rcrwireless.com/20200428/5g/how-can-mmwave-distributed-relays-expand-5g-coverage.) 2 pages.
Kitayama, D. et al., "5G radio access experiments on coverage expansion using metasurface reflector at 28 GHz." In 2019 IEEE Asia-Pacific Microwave Conference (APMC) (pp. 435-437). IEEE, 2019.
Langen, B. et al., "Reflection and transmission behaviour of building materials at 60 GHz." 5th IEEE International Symposium on Personal, Indoor and Mobile Radio Communications, Wireless Networks—Catching the Mobile Future, vol. 2. IEEE, 1994.
Laurin, J-J. "Specular reflection analysis for off-specular reflectarray antennas." IEEE transactions on antennas and propagation 61.7 (2013): 3575-3581.
Li, Z. et al, "REITS: Reflective surface for intelligent transportation systems." In Proceedings of the 22nd International Workshop on Mobile Computing Systems and Applications, 2021 (pp. 78-84).
Li, Z. et al., "Towards programming the radio environment with large arrays of inexpensive antennas." In 16th USENIX Symposium on Networked Systems Design and Implementation (NSDI 19) (pp. 285-300).
LitePoint. [n. d.]. Transitioning from DVT to manufacturing for 5G FR2 mmWave devices. ([n. d.]). (Available at https://www.litepoint.com/zh-hant/knowledgebase/transitioning-from-dvt-to-manufacturing-for-5g-fr2-mmwave-devices/.) 24 pages.
Mahony, J.D. "On the relationship between the directivity and the half-power beamwidth in quasi-symmetric pencil-beam radiation patterns." IEEE Antennas and Propagation Magazine 54.4 (2012): 238-243.
Movandi. Movandi-Powered Smart Repeaters Solve 5G Deployments. (Available at movandi.com/snart-repeaters/) 1 page.
Nayeri, P. et al., 2018. Reflectarray Antennas: Theory, Designs and Applications. Wiley-IEEE Press.
Ndip, I. et al., "A comparative analysis of 5G mmWave antenna arrays on different substrate technolgies." In 2018 22nd International Microwave and Radar Conference (MIKON) (pp. 222-225). IEEE, 2018.
Nitsche, T. et al., "IEEE 802.11ad: diectional 60 GHz Communication for Multi-Gbps Wi-Fi," (Available at https://cse.sc.edu/~sur/csce790_f18/materials/11ad_standard_paper.pdf), 10 pages.
Noghanian, S. (Apr. 2, 2020). "Efficient and Accurate Simulation of Antenna Arrays in Ansys HFSS." (Available at https://www.padtinc.com/2020/04/02/efficient-and-accurate-simulation-of-antenna-arrays-in-hfss/). 12 pages.
Nolan, J. et al., "RoS: passive smart surface for roadside-to-vehicle communication." In Proceedings of the 2021 ACM SIGCOMM 2021 Conference (pp. 165-178) 2021.
Obeidat, H.A. et al., et al. "Enhanced TOA estimation using OFDM over wide-band transmission based on a simulated model." Wireless Personal Communications (2022):123:3449-3461.
Park, J-Y. et al., "Effect of Cu electroplating parameters on microvoid formation and high-speed shear strength in Sn-3.0 Ag-0.5 Cu/Cu joints." Journal of Alloys and Compounds 724 (2017): 492-500.
Peng, Z. et al., "An effective coverage scheme with passive-reflectors for urban millimeter-wave communication." IEEE Antennas and Wireless Propagation Letters 15 (2015): 398-401.
Petosa, A. et al., "Characterization and Enhancement of the Environment for 5G Millimetre-wave Broadband Mobile Communications."
Price, K.V. et al. "Differential evolution: a practical approach to global optimization." Springer Science & Business Media, 2006.
Qian, K. et al., "MilliMirror: 3D printed reflecting surface for millimeter-wave coverage expansion." Proceedings of the 28th Annual International Conference on Mobile Computing And Networking. 2022.
Rajagopalan, H. et al., "On understanding the radiation mechanism of reflectarray antennas: An insightful and illustrative approach." IEEE Antennas and Propagation Magazine 54.5 (2012): 14-38.
Remcom. [n. d.]. Wireless InSite 3D Wireless Prediction Software. ([n. d.]). (Available at https://www.remcom.com/wireless-insite-propagation-software). 1 page.
Remcom. [n. d.]. Wireless InSite References. ([n. d.]). (Available at https://www.remcom.com/wireless-insite-propagation-software#References.) 2 pages.
Rizzato, F. "Quantifying the mmWave 5G experience in the US—July update." (Jul. 13, 2021). Available at https://www.opensignal.com/2021/07/13/quantifying-the-mmwave-5g-experience-in-the-us-july-update.) 3 pages.
Rofougaran, R. "5G mmWave mobility powered by Movandi," https://www.youtube.com/watch?v=1FnWOHG64Gw, 2021.
Ross, R. "Radar cross section of rectangular flat plates as a function of aspect angle." IEEE Transactions on Antennas and Propagation 14.3 (1966): 329-335.
Samaiyar, A. et al., "Iterative Phase Correction Technique for Design of Non-Conventional Reflectarray Antennas." In 2018 IEEE International Symposium on Antennas and Propagation & USNC/URSI National Radio Science Meeting (pp. 1181-1182). IEEE,2018.
Samantaray, D. et al., "A gain-enhanced slotted patch antenna using metasurface as superstrate configuration." IEEE Transactions on Antennas and Propagation 68.9 (2020): 6548-6556.

(56) References Cited

OTHER PUBLICATIONS

Schultz, B. "802.11 ad—WLAN at 60 GHz—A technology introduction." Rohde & Schwarz (2013).
Skolnik, M. 2008. Radar Handbook, Third Edition. McGraw Hill; 3rd edition. 2 parts.
Soltanaghaei, E. et al., "Millimetro: mmWave retro-reflective tags for accurate, long range localization." In Proceedings of the 27th Annual International Conference on Mobile Computing and Networking (pp. 69-82).
Stahler, Y.E. "Corner reflectors as elements passive communication satellites." IEEE Transactions on Aerospace 1.2 (1963): 161-172.
StrataSys, "Veroclear", (Available at https://www.stratasys.com /en/materials/materials-catalog/polyjet-materials/veroclear/), 10 pages.
Taha, A. et al., "Enabling large intelligent surfaces with compressive sensing and deep learning." IEEE access 9 (2021): 44304-44321.
Tan, X. et al., "Enabling indoor mobile millimeter-wave networks based on smart reflect-arrays." IEEE INFOCOM 2018—IEEE Conference on Computer Communications. IEEE, 2018.
Tan, Y. et al., "Versatile fabrication of intact three-dimensional metallic butterfly wing scales with hierarchical sub-micrometer structures." Angewandte Chemie International Edition 50.36 (2011): 8307-8311.
Tang, W. et al., "Path Loss Modeling and Measurements for Reconfigurable Intelligent Surfaces in the Millimeter-Wave Frequency Band." arXiv preprint arXiv:2101.08607 (2021).
Tcvetkova, S.N. et al., "Multi-Channel Reflectors: Versatile Performance Experimentally Tested." arXiv preprint arXiv:1801.09384 (2018).
Ticra. [n. d.]. Reflectarray antenna design. ([n. d.]). (Available at https://www.ticra.com/reflectarray-antenna-design/). 3 pages.
Van Valkenburg, M.E. "Reference Data for Engineers: Radio, Electronics, Computers and Communications." Newnes, 2001.
Wakatsuchi, H. et al., "Waveform-dependent absorbing metasurfaces." Physical review letters 111.24 (2013): 245501.
Wang, S. et al., "Demystifying millimeter-wave V2X: Towards robust and efficient directional connectivity under high mobility." Proceedings of the 26th annual international conference on mobile computing and networking. 2020, 677-690.
Wang, S. et al., "X-array: Approximating omnidirectional millimeter-wave coverage using an array of phased arrays." Proceedings of the 26th Annual International Conference on Mobile Computing and Networking. 2020.
Watts, G. "A surface treatment for non-specular reflection." In 2015 IEEE International Symposium on Antennas and Propagation & USNC/URSI National Radio Science Meeting, pp. 490-491. IEEE, 2015.
Wei, T. et al., "Pose information assisted 60 ghz networks: Towards seamless coverage and mobility support." In Proceedings of the 23rd Annual International Conference on Mobile Computing and Networking, pp. 42-55. 2017.
Wikipedia. [n. d.]. Differential evolution. ([n. d.]). (Available at https://en.wikipedia.org/wiki/Differential_evolution). 4 pages.
Williams, T. "EMC for Product Designers." Newnes, 2016.
Xiong, X. et al., "Customizing indoor wireless coverage via 3D-fabricated reflectors." In Proceedings of the 4th ACM International Conference on Systems for Energy-Efficient Built Environments, 2017, (10 pages).
Yi, H. et al., "3-D printed millimeter-wave and terahertz lenses with fixed and frequency scanned beam." IEEE Transactions on Antennas and Propagation 64.2 (2015): 442-449.
Zelaya, R. I., Sussman, W., Gummeson, J. et al., "LAVA: fine-grained 3D indoor wireless coverage for small IoT devices." In Proceedings of the 2021 ACM SIGCOMM 2021 Conference (pp. 123-136).
Zhao, H. et al., "Metasurface-assisted massive backscatter wireless communication with commodity Wi-Fi signals." Nature communications 11.1 (2020): 3926.
Zhao, R. et al., "M-Cube: A millimeter-wave massive MIMO software radio." In Proceedings of the 26th Annual International Conference on Mobile Computing and Networking, 2020, 14 pages.

* cited by examiner (b) Phase shifts (a) Structure (a) Dielectric constant error (b) Element width $w_d$ (c) Minimum thickness (d) Benefit from dielectric material

3D PRINTED REFLECTING SURFACE FOR MILLIMETER-WAVE COVERAGE EXPANSION

CROSS REFERENCES TO RELATED APPLICATIONS

This application claims the benefit of priority of U.S. Provisional Application No. 63/589,543 filed on Oct. 11, 2023, which is incorporated herein by reference in its entirety and for all purposes.

STATEMENT OF GOVERNMENT SPONSORED SUPPORT

This invention was made with government support under CNS-1901048 and CNS-1925767 awarded by the National Science Foundation. The government has certain rights in the invention.

SUMMARY

In some example embodiments, there may be provided a passive metasurface that is configured to reshape and re-steer millimeter wave signals, such as beams, to certain directions to illuminate for example coverage blind spots.

In some embodiments, there is provided an apparatus for reflecting at least one millimeter wave beam, the apparatus includes a metasurface configured with a plurality of metal-backed dielectric cuboids, wherein each of the metal-backed dielectric cuboids includes a dielectric material having a first surface of the dielectric material and an opposite, second surface of the dielectric material, wherein the first surface of the dielectric material is in a same plane as the second surface of the dielectric material, wherein the dielectric material comprises a cuboid defined at least by a width and a thickness, and a metal layer having a first surface of the metal layer and an opposite second surface of the metal layer, wherein the second surface of the dielectric material is disposed on the first surface of the metal layer.

In some variations, one or more features disclosed herein including one or more of the following features may be implemented as well. The thickness of the metal-backed dielectric cuboid is in a range of 0.4 millimeters to 4.3 millimeters. The thickness configures an amount of phase shift provided by the metal-backed dielectric cuboid to at least one millimeter wave beam incident on the first surface of the of the dielectric material. The width of the metal-backed dielectric cuboid is in a range of 0.9 millimeters to 3.1 millimeters. At least one millimeter wave beam is received from a cellular base station and reflected, by the apparatus, towards a user equipment. The first surface of the metal layer and the second surface of the metal layer are flat. The metasurface includes the first surface of the metal layer and the second surface of the metal layer are flat. The metasurface includes the first surface of the dielectric material is configured with different thicknesses to provide different phase shifts to generate a reflected output beam pattern. The metasurface may be located in a far field of at least one base station transmitting towards at least one user equipment to reflect at least one millimeter wave beam. A plurality of metasurfaces may be located in a far field of at least one base station to each reflect at least one millimeter wave beams towards at least one user equipment to improve coverage area associated with at least one base station. The thickness of the dielectric material is determined based on a phase shift, wherein the phase shift is determined before manufacture of the apparatus using a closed-form model that solves for an objective reflective beam pattern. The thickness configures an amount of phase shift provided to at least one millimeter wave beam incident on the first surface of the dielectric material. The second surface of the dielectric material is disposed on a bonding layer that is disposed on the first surface of the metal layer. The bonding layer includes a chromium layer. The metal-backed dielectric cuboids includes square faces and/or rectangular faces. The thickness of a cuboid is determined using a closed form-model of the metasurface configured with the plurality of metal-backed dielectric cuboids, the closed-form model based on a phase error of each of the plurality of metal-backed dielectric cuboids, wherein each phase error maps to a thickness of each of the plurality of metal-backed dielectric cuboids. The closed-form model uses two-orthogonal one-dimensional representations of an objective reflective beam pattern. At least a portion of the metasurface may be manufactured using a printing technology.

In some embodiments, there is provided a method including distributing a plurality metasurfaces for reflecting at least one millimeter wave beam, wherein the metasurface is configured with a plurality of metal-backed dielectric cuboids, wherein each of the metal-backed dielectric cuboids comprise a dielectric material having a first surface of the dielectric material and an opposite, second surface of the dielectric material, wherein the first surface of the dielectric material is in a same plane as the second surface of the dielectric material, wherein the dielectric material comprises a cuboid defined at least by a width and a thickness, and a metal layer having a first surface of the metal layer and an opposite second surface of the metal layer, wherein the second surface of the dielectric material is disposed on the first surface of the metal layer; and reflecting, by at least one of the plurality of metasurfaces, at least one millimeter wave beam from a cellular base station towards a user equipment.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
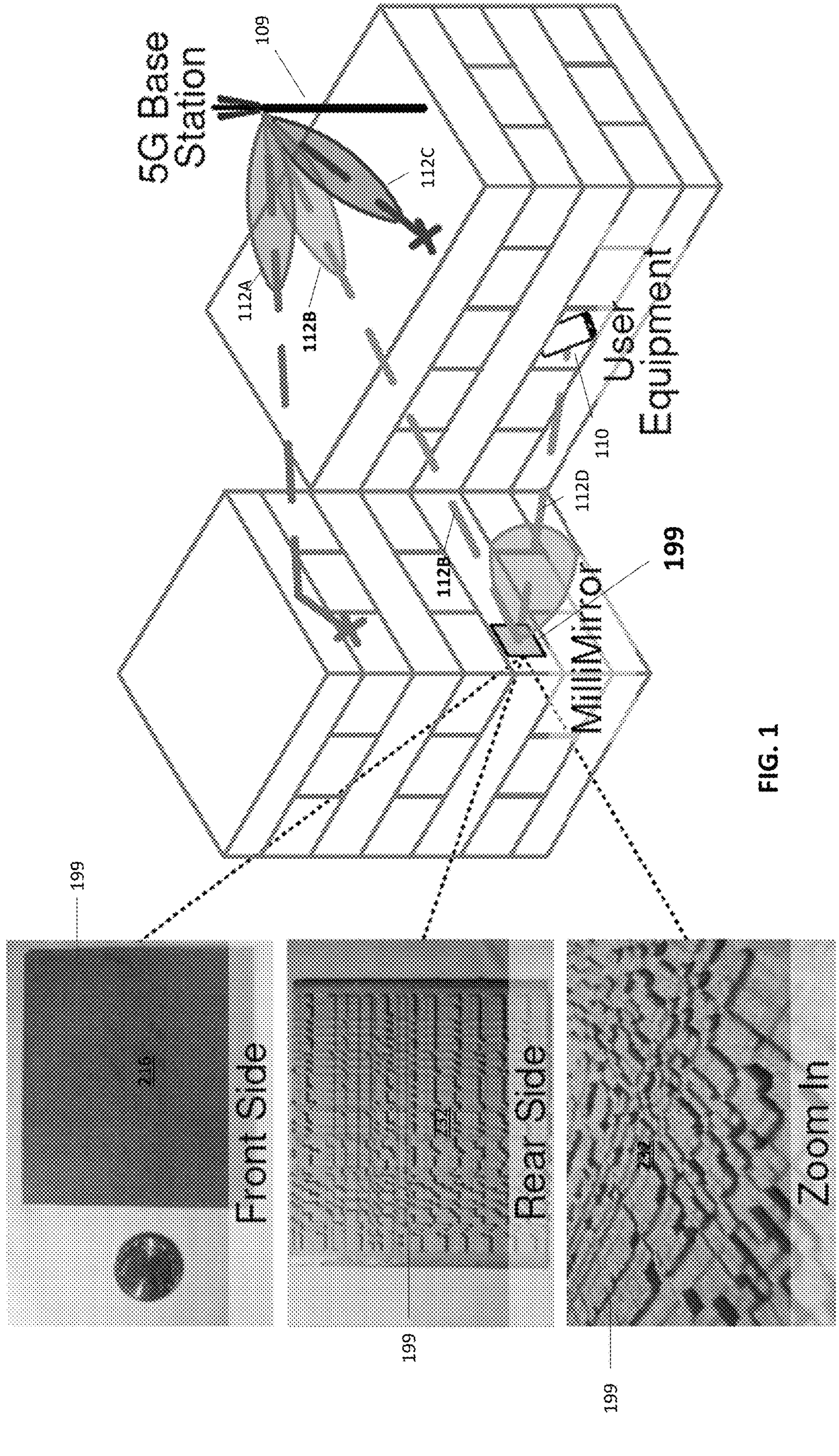
FIG. 1 shows an example deployment of a metasurface reflective mirror, in accordance with some embodiments.

Millimeter wave technology has long been advocated as a cornerstone for many radio technologies. More recently, millimeter wave technology has been deployed by major cellular carriers worldwide due to the exponential growth of mobile data and the pressing spectrum crunch at the low-frequency bands. For example, millimeter wave is being used for 5G cellular broadband on the 20-40 GHz spectrum, and being used for WiGig (e.g., IEEE 802.11ad/ay) on the 57-71 GHz band, and millimeter wave will likely expand to above 100 GHz in the forthcoming 6G era. Despite the prospects of millimeter wave technology, the propagation artifacts and the resulting spotty millimeter wave coverage remains a fundamental barrier that hinders the pervasive use of millimeter wave technologies. Recent measurement shows that millimeter wave 5G connections appears less than 1% of the time on average across carriers in the US. Complicating things further, traditional outdoor-to-indoor coverage is almost impossible with millimeter wave, particular for modern buildings in so-called “urban canyon environments.” These problems are just a precursor to the beyond-5G era, when spectrum use may move to the sub-terahertz bands with higher directionality and worse propagation artifacts. As such, although next generation wireless networks will embrace millimeter wave technology for high-capacity usage, millimeter wave radios do provide a fundamental coverage limitation due to certain physical properties of millimeter waves, and these properties include high directionality and propagation artifacts.

In some embodiments, there is provided a metasurface that provides a millimeter wave reflector to expand coverage of for example 5G base stations (as well as other millimeter wave transmitters). As used herein, the phrase “metasurface” refers to an array including a subwavelength structure (also referred to as “elements”) arranged in a configured or defined pattern to manipulate electromagnetic waves at subwavelength scales. The metasurface may be fabricated using 3D printing technology, although other fabrication techniques may be used as well. In some embodiments, there may be provided a fully passive metasurface that reflects (and/or reshapes and/or re-steers) millimeter wave signals, such as beams to certain (e.g., anomalous or Non-Snell’s Law) directions to illuminate coverage blind spots, in accordance with some embodiments. Moreover, a closed-form model is disclosed herein that efficiently synthesizes the passive metasurface design with thousands of unit elements and across a wide frequency band. Further, there is disclosed herein an example of a process of making the millimirror using, for example, 3D printing and metal deposition to fabricate passive metasurface. For example, at least a portion of the metasurface may be manufactured using a printing technology, such as 3D printing technology.

In some embodiments, there is provided a metasurface that provides a reflective radio frequency (RF) surface (also referred to herein as a “millimirror”). The millimirror may be generated as a three-dimensional (3D) metasurface. The millimirror may provide a new paradigm to tackle the above-noted millimeter wave coverage problems. For example, the millimirror may not create millimeter wave signals but instead the millimirror may reflect reflects millimeter wave signals towards certain, anomalous directions that do not comply with, for example, Snell’s laws. Moreover, the millimeter may even reshape the signals into a variety of beam patterns—thus overcoming intrinsic propagation artifacts and illuminating the coverage blind spots.

Moreover, the millimirror may, in some embodiments, not include active electronic components, relays, or digitally controlled reflect array. In addition, the millimirror may be mass fabricated through for example ordinary 3D printing processes, although other fabrication techniques may be used as well. Owing to a thin form factor, the millimirror may be attached on the facades of the ambient environment such as buildings, walls, advertisement boards, and/or the like, to reflect millimeter waves from a base station towards a user equipment.

FIG. 1 demonstrates a representative use case of a millimirror 199, in accordance with some embodiments. In the example of FIG. 1, a base station 109, such as a 5G base station or other type of wireless access point or transceiver, radiates one or more beams 112A-C, such as millimeter wave beams formed by the 5G base station. In the example of FIG. 1, a third beam 112C encounters blockage of line of sight (LoS) towards for example at least one user equipment, such as a user equipment 115 (e.g., a smartphone, a cellphone, etc.), and the lack of (or weak) multipaths from natural reflectors signals from the base station 109 cannot reach the user equipment 115. In the example of FIG. 1, the user equipment is located indoors which may further exacerbate the millimeter wave coverage problems, although the millimirror may be used to alleviate coverage issues with an outdoor base station and outdoor user equipment as well.

In the example of FIG. 1, the millimirror 199 is placed at a location near the user equipment 110 to reflect (and/or re-focus and/or re-direct, for example) the second beam 112B to create a strong non line of sight (NLoS) path (e.g., beam 112D) towards the user equipment 110. And the reciprocity of the RF channel enables the millimirror 199 to facilitate the uplink from the user equipment to the base station as well. Moreover, the millimirror 199 may be transparent to the standard millimeter wave beam management radio protocols at the base station, so no modification or intervention to the existing millimeter wave devices or its protocols are needed.

Although FIG. 1 depicts a single millimirror 199, a plurality of millimirrors 199 may be distributed in a region (or regions) to enhance the coverage of at least one base station, such as base station 109. In this way, blind spots or weaknesses in the base station coverage areas can be addressed by distributing millimirror 199 at different locations in the region(s) served by for example the base station 109.

In some embodiments, the millimirror 199 may be comprised of a plurality of sub-wavelength elements. These elements are configured as reflectors forming a metasurface of the millimirror 199. To create the desired beamforming pattern at the millimirror 199, the millimirror may be configured with respect to the type of the element reflector and the tuning (or configuration) of the reflection coefficient. In some embodiments, the type of reflector is a dielectric, such as a cuboid, a metal-backed dielectric cuboid, and/or other structure. In some embodiments, the tuning is performed by configuring the phase error (which maps to phase error) associated with the dielectric, such as the metal-backed dielectric cuboid and/or the like.

Figure 2A:
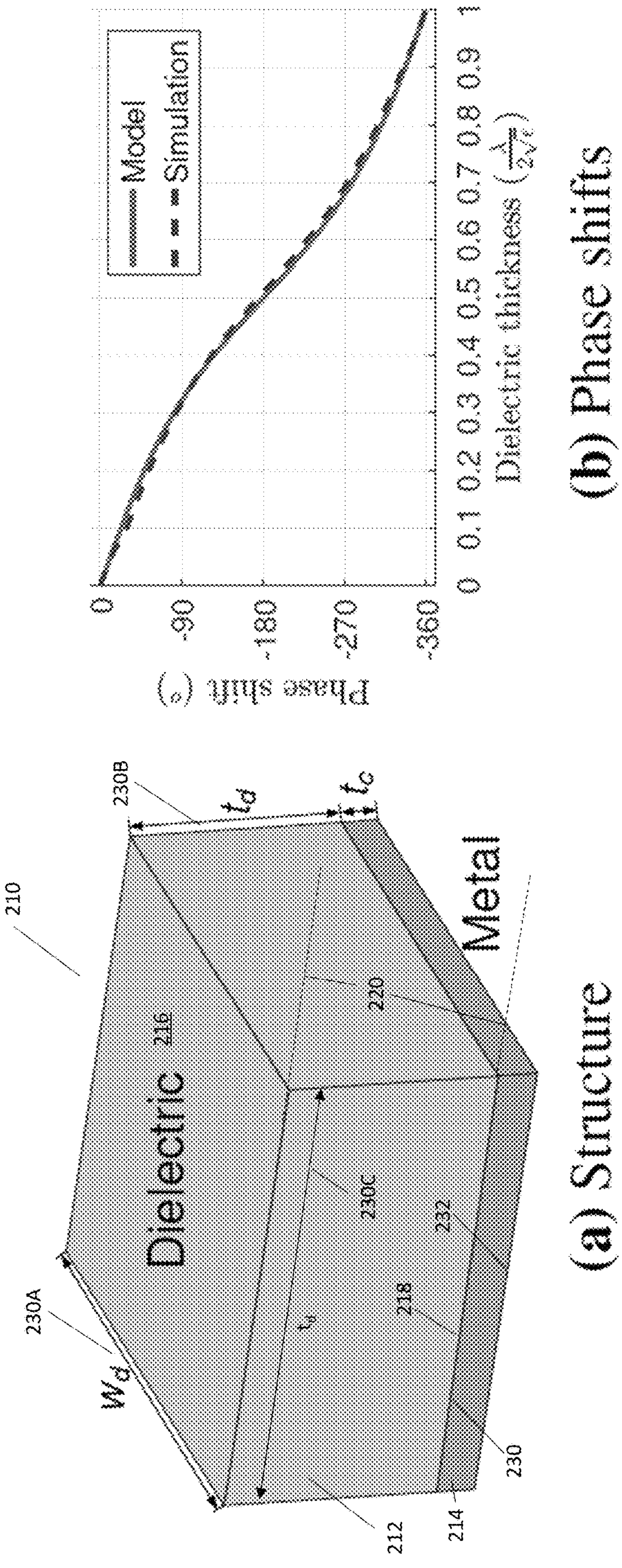
FIGS. 2A and 2B depict examples of a metasurface millimirror including a metal-backed dielectric cuboid, in accordance with some embodiments.

In some embodiments, the millimirror 199 comprises one or more small cuboids (made of dielectric material and backed by a thin metal layer). The cuboids provide sub-wavelength element reflectors for the metasurface of the millimirror 199. The term "cuboid" refers to hexahedron with quadrilateral faces, such as six faces. The cuboid may be a cube cuboid (e.g., 6 congruent square surfaces), a rectangular cuboid (e.g., 3 pairs of rectangles), and/or other shapes. In the example of FIG. 2A, the metal-backed dielectric cuboid 210 comprises 6 faces that are rectangular. Alternatively, or additionally, the metal-backed dielectric cuboid 210 may comprise a least two square faces and at least four rectangular faces.

In some embodiments, the cuboid comprises a metal-backed dielectric cuboid (MBDC). The metal-backed dielectric cuboid may be readily fabricated and may lead to a closed-form model for the reflection coefficient solution. By tuning the thickness of the metal-backed dielectric cuboid, different phase shifts ranging from 0° to 360° can be applied to the reflection signal that emanates from the millimirror 199. In other words, the thickness of the dielectric of the cuboid configures an amount of phase shift provided by the cuboid to at least one millimeter wave beam incident on the first surface of the of the dielectric material and reflected from the first surface. For example, the millimirror 199 may be packaged with for example an array (e.g., thousands) of the metal-backed dielectric cuboid reflectors with different phase shifts, such that the millimirror 199 can be configured with the capability of adjusting the reflected beam's signal power to any direction and thus re-steering the incident millimeter wave beam's signals towards for example non-Snell's directions. Snell's law states that the ratio of the sines of the angles of incidence and refraction of a wave are constant when it passes between two given media, so the reflection provided by the millimirror 199 can be in Non-Snell directions (i.e., so the angles of incidence and angle of refraction are not equal. Referring to FIG. 1, the millimirror 199 comprising a metasurface formed with a plurality of metal-backed dielectric cuboid reflectors receive an incident beam 112B and form a reflected beam 112D in for example a non-Snell's direction toward the user equipment 110 (which would be in a coverage blind spot but the millimirror).

In some embodiments, the millimirror 199 comprises metasurface, wherein the metasurface is configured with an array, such as a plurality, of metal-backed dielectric cuboids. FIG. 2A depicts an example of a one of the metal-backed dielectric cuboids 210 of the array of metal-backed dielectric cuboids.

Referring to FIGS. 1 and 2, the metal-backed dielectric cuboids 210 includes a dielectric 212 material layer and a metallic 214 layer. The dielectric material comprises a first surface 216 and an opposite, second surface 218. The first surface 216 and the second surface are in the same parallel plane 220. The dielectric material comprises a cuboid defined by a width ($w_d$) 230A, a thickness ($t_d$) 230B, and a length ($l_d$) 230C.

In some embodiments, the maximum thickness ($t_d$) 230B is based on the millimeter wave frequency being reflected, so given a millimeter range of frequencies between 24 GHz and 81 GHz for example, the maximum thickness ($t_d$) (which maps to a corresponding phase shift) is between is between 1.6 millimeters (mm) and 4.3 mm. The minimum thickness ($t_d$) 230B may, however, be dictated by structural strength of the metasurface, so the thickness ta 230B should be at least 0.4 mm. The width ($w_d$) 230A may vary between 3.1 mm and 0.9 mm, although it is not frequency dependent as is the case for the thickness ($t_d$).

Referring to the metal 214 layer, it may include a first surface 230 and an opposite second surface 232, wherein the second surface 218 of the dielectric material is disposed on the first surface 230 of the metal layer.

To illustrate further by way of an example, the millimirror 199 may comprise a plurality of sub-wavelength unit element reflectors, such as the metal-backed dielectric cuboids. The metal-backed dielectric cuboid (MBDC) is, as noted, relatively easy to fabricate and provides a closed-form phase model. As shown FIG. 2A, the metal-backed dielectric cuboid 210 includes a structure with a thick dielectric 212 (as a top layer) on a thin metallic 214 layer (as a bottom layer). The thickness of the dielectric 212 cuboid may vary across different metal-backed dielectric cuboid elements of the millimirror 199, but they all share the same top surface (see, e.g., 412 at FIG. 4) that forms a flat dielectric surface. When thousands of such metal-backed dielectric cuboids are placed tightly together, the corresponding metasurface looks like a dielectric slab with a flat top but many rectangular "stacks" etched on the bottom as shown at 232 (see, e.g., FIG. 4). Referring to 416A at FIG. 4, it represents a first metal-backed dielectric cuboid having a first configuration, while 416B represents a second metal-backed dielectric cuboid having a second configuration, and so forth through the millimirror 199 to form a configured "pattern" that provides the desired reflected beamforming.

Figure 2B:
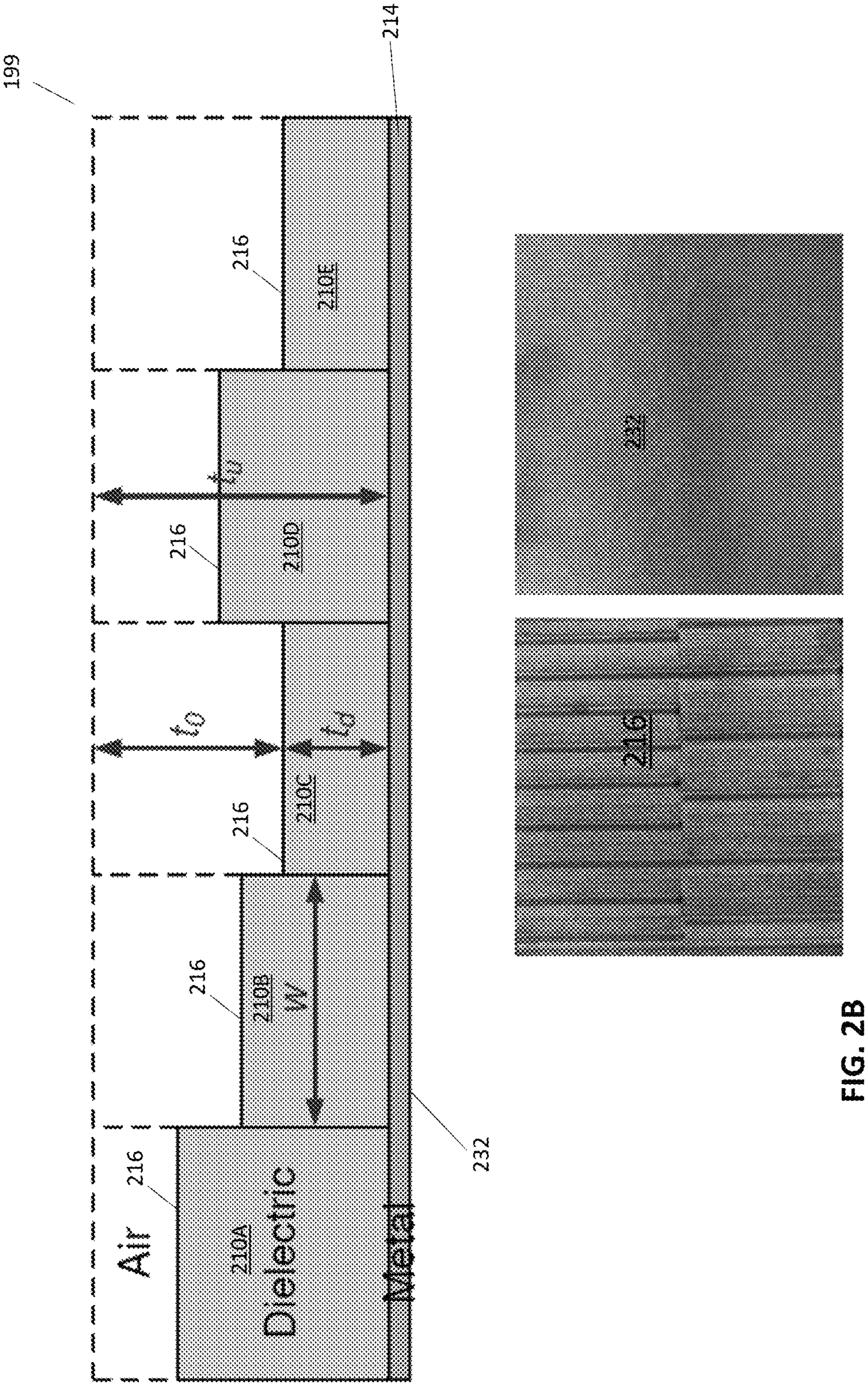

In the example of FIG. 1 and FIG. 2A, the dielectric's first surface 216 of the millimirror 199 is relatively flat while the second surface 232 of the metal layer (the so-called rear side of the millimirror) is not flat (e.g., bumpy) due to the different thickness of the dielectric portions of the MBDCs as shown at FIG. 1 at 232), wherein the different thicknesses modulate the phase shift of incident signals. However, in some implementations, the millimirror 199 may have a flat copper side. FIG. 2B depicts at least a portion of a millimirror 199 including a plurality of metal-backed dielectric cuboids 210A-E layered on a metal 214 layer, where the dielectric first surface 216 (or side) is not flat due to the different thickness of the cuboids 210A-E while the metal side dielectric side is relatively flat. The implementation of FIG. 2B may have a slower phase change with respect to the dielectric thickness than the implementation of FIG. 2A, and the implementation of FIG. 2B may be easier to manufacture (due to the flat conductive metal layer) when compared to the FIG. 2A implementation.

Before deploying the millimirror 199, the "objective" reflective beam pattern (i.e., the desired beam pattern of the reflected beams such as beam 112D) that is reflected by the millimirror 199 when presented by an incident millimeter wave beam is determined. Referring to FIG. 1 for example, the objective reflective pattern could be one or more beams, such as beam 112B and the like, towards to user equipment 110, although other objective reflective beam patterns may be desired as well. For a desired objective reflective pattern, the phase shifts provided by each of the cuboids of the millimirror 199 is determined based on an objective function (see, e.g., Equation 9 below). Each of the phase shifts map to a specific thickness for a given metal-backed dielectric cuboid. For example, the millimirror 199 may include an array of 1000 or more metal-backed dielectric cuboids 210. In this example, a phase shift is determined for each (if not all) of the metal-backed dielectric cuboids in the array. And each of the phase shifts maps directly to thickness for the dielectric portion of the metal-backed dielectric cuboid. This example makes it clear that the computation for the phase shifts can be resource intensive and complex to say the least. In some embodiments, an orthogonal 1-D decomposition is used to improve convergence towards a solution for the phase shifts needed to obtain the "objective" reflective pattern.

To create an objective reflection beam pattern for the outgoing, reflected beams from the millimirror 199, a solution may include a search of the phase shift configurations across for example thousands of patterns of unit element reflectors. But existing pattern synthesis algorithms, such as iterative Fourier transform and differential evolution algorithm, use parametric objective patterns, heuristic objective functions, and opportunistic searching strategies. Though applicable for traditional phased arrays, these pattern synthesis algorithms can converge slowly and can be very likely to end up with poor solutions in a huge searching space provided by the millimirror's array of metal-backed dielectric cuboid (which may each have different configurations such as depth).

To overcome the noted issues with existing pattern synthesis, in some embodiments, there is provided a novel reflection beam synthesis algorithm that transforms the objective reflective beam pattern using the power conservation between the incident and reflection signals. The transformation establishes a closed-form relation between the objective and the phase shifts to enable a more rapid convergence, when compared to the noted past pattern synthesis algorithms. An additional challenge is that the metal-backed dielectric cuboids may only modulate the phase, not magnitude, of incident signals, so nulls result in the reflected main lobe. The disclosed reflection beam synthesis algorithm overcomes this hindrance by approximating and decomposing the two-dimensional (2D) (e.g., in azimuth and elevation angles) pattern synthesis into two orthogonal on-dimensional (1D) processes, which can efficiently generate smooth patterns for the metasurface of the millimirror 199. Further, whereas a basic model for the millimirror 199 may assume single carrier signals, the desired phase shifts may deviate from the model over a wider bandwidth. This in turn distorts the desired beam pattern for large surfaces, for example. To overcome this challenge, a model is configured to decouple the size and the bandwidth of the millimirror 199. Moreover, the pattern synthesis for the millimirror 199 is implemented such that it becomes frequency independent. The size of millimirror 199 may thus be scaled up to increase the reflection gain, without limiting signal bandwidth.

In some embodiments, the fabrication of the millimirror 199 may be done using a so-called two-step deposition technique (i.e., sputtering and electroplating) to coat a metal, such as copper, layer. In some implementations, the millimirror 199 may yield lower cost compared with printed circuit board based fabricated reflect array antennas at the same millimeter wave frequency. For example, compared with a patch antenna array with similar size and gain, the cost of manufacture for the millimirror 199 may be lower by at least an order of magnitude.

As noted, the millimirror 199 represents an alternate solution to millimeter wave coverage problems. The millimirror 199, as noted, re-steers signals to cover for example a fixed blind spot or a wide area. Although the millimirror 199 is configurable only at design time of the millimirror 199, it is fully passive and does not require coordination with existing transmitters and/or receivers (e.g., at a base station or user equipment). Moreover, the millimirror 199 may be deployed in the far field of a transmitter (and/or a receiver) to reflect directional beam patterns towards fully blocked regions.

Figure 3:
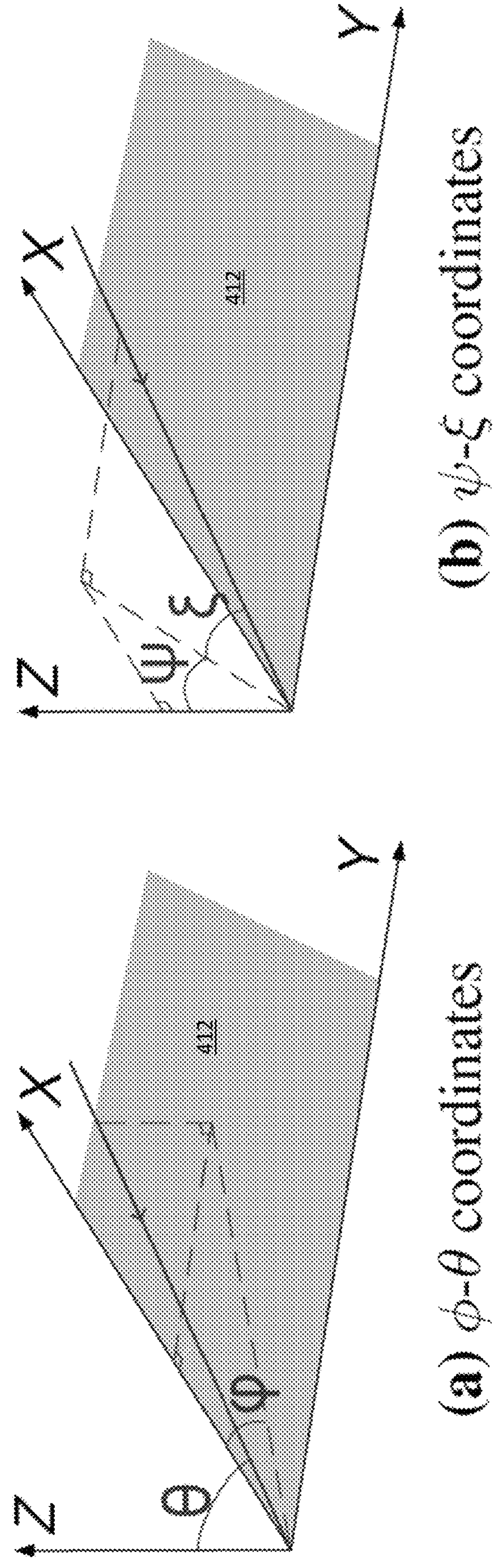
FIG. 3 depicts the geometric relationships between the incident signal and the top surface of the dielectric interface of the metal-backed dielectric cuboid structure, in accordance with some embodiments.
Figure 4:
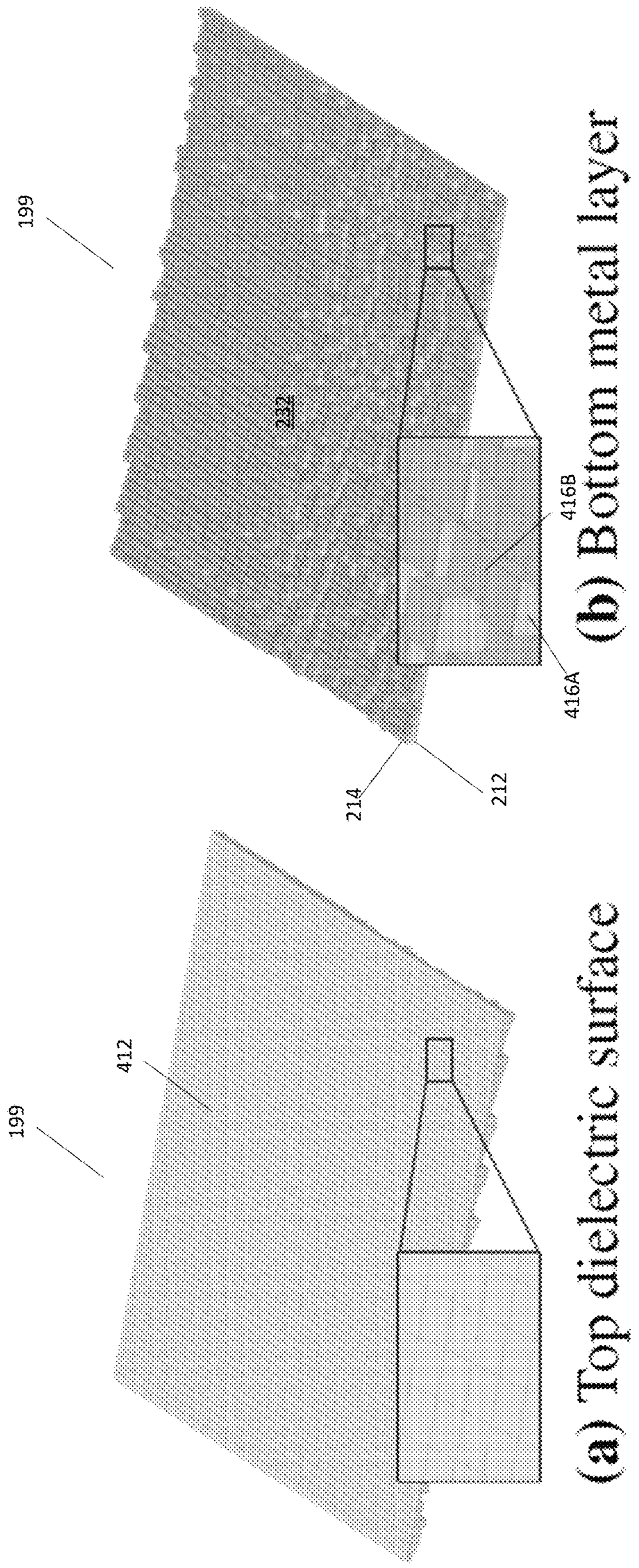
FIG. 4 shows an example of the structure of the surfaces of the metasurface millimirror, in accordance with some embodiments.

Referring to FIGS. 2A, 2B, and 4, incident RF signals, such as RF beam 112B, may penetrate the dielectric 212 portion of at least one of the metal-backed dielectric cuboids (or, e.g., all of the metal-backed dielectric cuboids of the millimirror 199), wherein the metal-backed dielectric cuboids have different dielectric thickness (and hence different impedances) before hitting the bottom metal 214 layer, so each of the cuboids may cause different levels of phase distortion (or shift) from the incident RF signal to the reflected output signal, such as RF beam 112D. The phase distortion may be characterized by the complex reflection coefficient Γ at the top dielectric surface of the dielectric cuboid, wherein RF signals enter and/or leave the metal-backed dielectric cuboid 210. The term Γ describes how much of a wave is reflected by the impedance discontinuity between the transmission medium (e.g., the air vs. the dielectric substrate), so Γ is formally defined as the ratio of the complex amplitude of the reflected wave to that of the incident wave, and can be characterized by the surface impedance of the dielectric surface as follows:

$$\Gamma = \frac{Z_s - RZ_0}{Z_s + RZ_0}, \tag{1}$$

wherein $Z_s$ is the normal impedance (in the unit of per Ω unit area) of the dielectric surface; $Z_0=120\pi\ \Omega$ is the impedance of free space, and $$R = \frac{\cos\phi}{\cos\xi}$$

is a coefficient that depends on the azimuth φ and elevation θ of the incident signal relative to the dielectric surface, as depicted at FIG. 3.

With an approximately lossless dielectric material, the normal impedance Zs of the metal-backed dielectric cuboid 210 may be considered pure reactance:

$$Z_s = \frac{jZ_0}{\sqrt{\epsilon}}\tan\frac{2\pi\sqrt{\epsilon}}{\lambda}t_d, \tag{2}$$

wherein € is the dielectric constant of the cuboid, and λ is the wavelength of the incident signal in free space; td is the thickness of the cuboid, i.e., the distance between the top dielectric surface and the bottom metal layer. Given that the impedance of free space is pure resistance, the complex reflection coefficient of the metal-backed dielectric cuboid 210 may be represented as:

$$\Gamma = e^{-j2\arctan\frac{1}{R\sqrt{\epsilon}}\tan\sqrt{\epsilon}kt_d} \tag{3}$$

Theoretically, when the thickness of the dielectric 212 portion of the metal-backed dielectric cuboid 210 varies from 0 to $$\frac{\lambda}{2\sqrt{e}},$$

the phase shift to the incident signal also varies from 0 to 2π. This effectively enables the metal-backed dielectric cuboid 210 to act as a phase shifter with respect to the incident signal. To verify the above model represented by Equation (3), an example implementation of the metal-backed dielectric cuboid 210 is created in a 3D electromagnetic field simulator with an incidental plane wave along its broadside direction, i.e., perpendicular to its top surface. FIG. 2A at (b) shows that the theoretical phase shifting as a function of the metal-backed dielectric cuboid 210 thickness matches the full wave simulation well.

By packing a plurality (e.g., thousands or other quantities as well) of metal-backed dielectric cuboids 210 elements to form a metasurface, the millimirror's 199 surface pattern may be solved with a closed-form reflection pattern. Supposing for example, the millimirror 199 comprises an array (e.g., N×N) of metal-backed dielectric cuboids 210 with side length or thickness of $w_d$. In this example, the phase shift of the metal-backed dielectric cuboid s at the k-th row and the l-th column of $\varphi_{k,l}$, and the azimuth and elevation angle of the incident signal is $\phi_i$ and $\theta_i$. The corresponding reflection gain towards the azimuth angle $\phi_r$ and elevation $\theta_r$ may be represented as:

$$F_{\phi_r,\theta_r} = \sum_{k,l=-N/2}^{N/2-1} \sqrt{\sigma_0}\, e^{j\varphi_{k,l}} \cdot e^{j\frac{2\pi}{\lambda}\vec{p}_{k,l}^T\vec{e}_i} \cdot e^{j\frac{2\pi}{\lambda}\vec{p}_{k,l}^T\vec{e}_r}, \tag{4}$$

wherein $\vec{e}=(\cos\phi\sin\theta, \sin\phi\sin\theta, \cos\theta)^T$ is the unit direction vector of the signal, $\vec{p}_{k,l}=(kw_d, lw_d, 0)^T$ is the location vector of the element at the k-th row and l-th column, and $\sigma_0$ is the reflection gain of a single metal-backed dielectric cuboid, which is estimated via full-wave simulation. The term $$e^{j\frac{2\pi}{\lambda}\vec{p}_{k,l}^T\vec{e}_i}$$

represents the phase delay introduced by different propagation distances when the signal approaches different metal-backed dielectric cuboids. The term $$e^{j\frac{2\pi}{\lambda}\vec{p}_{k,l}^T\vec{e}_i}$$

is the phase delay introduced by different propagation distances of the signal reflected by the metal-backed dielectric cuboids. Thus, by controlling the thickness of the metal-backed dielectric cuboid, the millimirror's 199 surface pattern can have a distribution of different phase shifts to form different reflected beam patterns.

As noted, the surface pattern where the metal-backed dielectric cuboids have different depths forms a pattern, and that pattern is what generates the reflection beam pattern(s) of the millimirror 199. The millimirror 199 creates signal paths between for example a source transmitter, such as the base station 109, and one or more blocked regions in the transmitter's coverage. Assuming for example the blocked regions (also referred to as blind spots) can be covered by a beam with certain a beamwidth, an objective beam pattern (also referred to herein as objective reflective beam patterns) can be specified for the millimirror 199 to cover one or more of the blind spots. The objective beam pattern may can be specified in terms of the beam's direction and the beam's width in for example a two-dimensional (2D) polar coordinate domain. But general patterns such as pencil beam and multi-arm beam follow the same synthesis method. Since the φ-θ coordinates have ambiguity around the +Z axis, in some implementations, the ψ-ξ coordinates (as shown at FIG. 2 at (b)) is used to define the beams pointing out of the X-Y plane, i.e., the dielectric surface. For example, a beam pattern is defined as a quaternion $\vec{b}=(\psi_0,\xi_0,\Delta_\psi,\Delta_\xi)$, wherein $\psi_0$ and $\xi_0$ represent the direction of the beam center, and $\Delta_\phi$ and $\Delta_\xi$ represent the beamwidth along the two perpendicular directions.

The objective reflective beam pattern for the reflected beam(s) of the millimirror 199 may be represented by the function $\tilde{F}_{\phi_r,\theta_r}$, for example. A goal of the reflection pattern synthesis search algorithm is to find, as noted, a set of phase shifts ($\varphi_{k,l}$) for the metal-backed dielectric cuboid 210 elements, such that the actual pattern $F_{\phi_r,\theta_r}$ approaches the objective $\tilde{F}_{\phi_r,\theta_r}$ which can be represented as:

$$\varphi_{k,l} = \operatorname{argmin}_{\varphi_{k,l}} \sum_{\phi_r,\theta_r} \left(|F_{\phi_r,\theta_r}|^2 - |\tilde{F}_{\phi_r,\theta_r}|^2\right)^2. \tag{5}$$

As noted, standard beam pattern synthesis algorithms for active phased arrays, such as iterative Fourier transform and differential evolution algorithm, use variants of Equation (5) as objective functions. However, these algorithms are not guaranteed to generate near-optimal patterns. First, these algorithms usually normalize the objective patterns by the main lobe level (MLL) and use the power delta between the main lobe level and the side lobe level (SLL) to characterize the objective beam pattern. However, determination of the power delta relies on heuristics. If it is too small, the main lobe level of the resulting pattern is not maximized. If it is too large, the large errors at the side lobe region will prevent the algorithm from converging. Second, each error term in Equation (5) depends on all variables $\phi_{k,l}$ with orders as high as 4, making the derivative of Equation (5) too complex and computationally prohibitive. As a result, these algorithms essentially need to search the solutions in a randomized manner, which converges slowly (if at all) and will very likely end up with a poor local optimum.

To find a near-optimal solution for the phase shifts provided by the metal-backed dielectric cuboids 210, the objective beam pattern function may be configured such that there is provided a closed-form gradient. Since the transmitter, such as a base station, and the millimirror 199 are static, the phase delays of the incident RF signal at the metal-backed dielectric cuboids 210 are fixed. With that, first, let $$\hat{\varphi}_{k,l} = \varphi_{k,l} + \frac{2\pi}{\lambda}\vec{p}_{k,l}^{T}\vec{e}_i.$$

Next, the objective beam pattern function is transformed into a new u-v coordinate domain with $$u = \frac{Nw_d\cos\phi\sin\theta}{\lambda}, \text{ and } v = \frac{Nw_d\sin\phi\sin\theta}{\lambda}.$$

Accordingly, the reflection pattern $F_{\phi_r,\theta_r}$ is transformed into:

$$F_{u,v} = \frac{1}{N}\sum_{k,l=-N/2}^{N/2-1}\sqrt{\sigma_0}\,e^{j\hat{\varphi}_{k,l}}\cdot e^{j\frac{2\pi}{N}(ku+lv)}. \tag{6}$$

Referring to Equation (6), it reveals that $F_{u,v}$ is the 2D Fourier transform of the phasors $e^{j\hat{\varphi}_{k,l}}$. According to Parseval's theorem, the total radiation power should satisfy:

$$\sum_{u,v=-N/2}^{N/2-1}|F_{u,v}|^2 = \sum_{k,l=-N/2}^{N/2-1}\left|\sqrt{\sigma_0}\,e^{j\hat{\varphi}_{k,l}}\right|^2 = N^2\sigma_0. \tag{7}$$

Given the total power $N^2\sigma_0$, the amplitude of the objective pattern $|\tilde{F}_{u,v}|$ can be defined by distributing the total power equally to the u-v region that corresponds to the main lobe in the original polar coordinates.

Since $|\tilde{F}_{u,v}|$ loses the phase in-formation and is not derivative with respect to $\hat{\phi}_{k,l}$, the $\hat{\phi}_{k,l}$, may be optimized based on the radiation power of the objective pattern $|\tilde{F}_{u,v}|^2$. For example, the pattern power $|\tilde{F}_{u,v}|^2$ may be represented as the 2D 2N-point inverse Fourier transform of the autocorrelation coefficient $R_{p,q}$ of the phase shifts as follows:

$$|F_{u,v}|^2 = \sum_{p,q=-N}^{N-1} R_{p,q}e^{\frac{2\pi}{2N}(p(2u)+q(2v))}, \text{ where} \tag{8}$$

$$R_{p,q} = \sum_{m,n=max(-N/2,p-N/2)}^{min(N/2-1,N/2-1-p)} \sigma_0 e^{j(\hat{\varphi}_{m+p,n+q}-\hat{\varphi}_{m,n})}$$

Since $R_{p,q}$ uniquely determines $|\tilde{F}_{u,v}|^2$ via Fourier transform, the phase shifts $\hat{\phi}_{k,l}$, may be optimized by minimizing the error E between the theoretical and objective $R_{p,q}$:

$$E = \sum_{p,q}\left|R_{p,q} - \overline{R}_{p,q}\right|^2. \tag{9}$$

Compared with Equation (5), each error term in Equation (9) is only related to a few phase shifts with an order of 2, so a closed-form derivative may be calculated:

$$\frac{\partial E}{\partial \varphi_{k,l}} = \sigma_0 Re\left\{\sum_{p,q}\cos\left(R_{p,q} - \hat{R}_{p,q}\right)e^{j\left(\varphi_{k+p,l+q}-\varphi_{k,l}-\frac{\pi}{2}\right)} + \right.$$

-continued $$\left.\sum_{p,q}\cos\left(R_{p,q} - \hat{R}_{p,q}\right)e^{j\left(\varphi_{k,l}-\varphi_{k-p,l-q}+\frac{\pi}{2}\right)}\right\}.$$

Given the derivative formulation, Newton-Raphson's method is applied to solve Equation (9) and obtain the phase weights $\varphi_{k,l}$, which are then used to determine the thickness of each unit element (e.g., the width or thickness of each metal-backed dielectric cuboid 210 of the array of metal-backed dielectric cuboids) of the millimirror 199.

Figure 5:
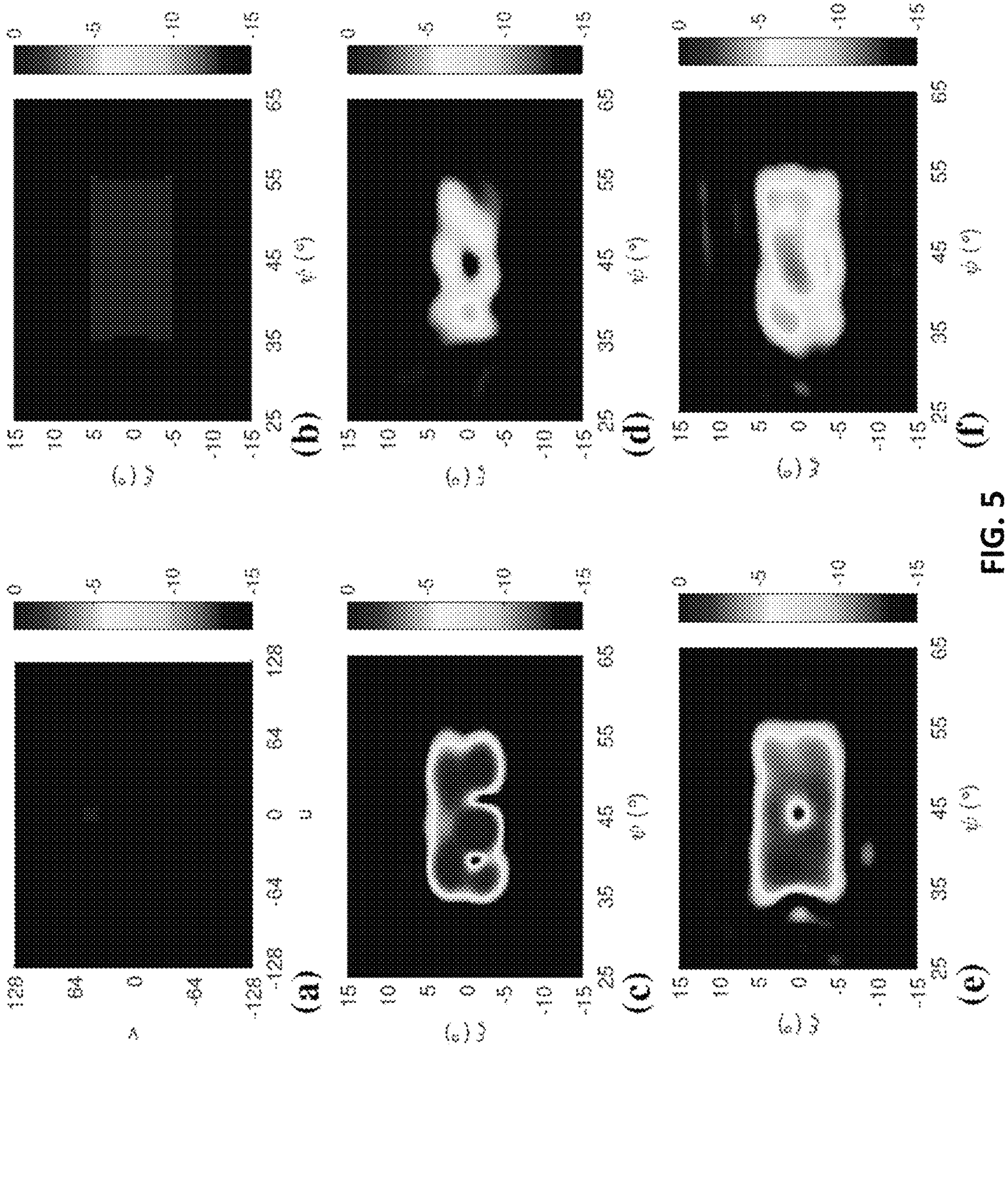
FIG. 5 depicts simulated performance examples for different pattern synthesis methods, in accordance with some embodiments.

To gauge the millimirror 199 reflection beam synthesis method with a so-called standard iterative Fourier transform and particles swarm optimization, an example is used with a millimirror 199 surface of 64×64 metal-backed dielectric cuboids and thickness of $w_d$=1.25 mm. As an example for comparison, a fan beam is of (45°, 0°, 20°, 10°). FIG. 5 at (a) and (b) show the objective reflective pattern in the u-v and ψ-ξ coordinates, respectively. Considering conservation of the power in Equation (7), the objective pattern in FIG. 5 at (a) is the optimal pattern that can be achieved by millimirror 199. FIG. 5 at (c) and (d) show the pattern generated by different methods. While all the methods create nulls within the main lobe region, the pattern synthesized by the disclosed method of Equation 9, in accordance with some embodiments (see, e.g., FIG. 5 at (e)) is closest to the objective reflective pattern (at, e.g., FIG. 5 at (b)) with the least number of nulls.

Nulls may be inevitable when synthesizing 2D patterns, mainly due to two reasons. First, the metal-backed dielectric cuboids can only change the phase of the signal, limiting feasible space of the patterns generated by the millimirror 199. Second, the 2D main lobe region and side lobe region depend on the same $N^2$ phase shifts and thus are coupled in a complex way. It is observed that minimizing the side lobe level results in nulls in the main lobe region, as shown in FIG. 5 at (c), (d), and (e). For objective reflective beam patterns with a single main beam, a suboptimal solution without nulls in the main beam may be generated by factorizing the 2D pattern synthesis into two one-dimensional (1D) pattern synthesis. For example, given an objective reflective pattern $\tilde{F}_{u,v}$, the maxima and minima of u and v of the main lobe is determined. Then, the main lobe is extended to a rectangular region $\{(u,v)|u_{min}\le u\le u_{max}, v_{min}\le v\le v_{max}\}$. Since the transform of a regular beam in the u-v coordinates has a convex shape and can be approximated as a rectangle, as illustrated in FIG. 5 at (a), the extension of the main beam only introduces a minor decrease of the main lobe level.

With a rectangular main lobe in the u-v coordinates, the 2D beam pattern can be factorized as the product of two 1D beam patterns (e.g., $F_{u,v}=F_u*F_v$), wherein $$F_s = \frac{1}{\sqrt{N}}\sum_{k=-N/2}^{N/2}\sigma_0^{\frac{1}{4}}e^{j\varphi_k}e^{j\frac{2\pi}{N}ks}, \text{ for } s = u, v. \tag{10}$$

Next, the 1D version of the autocorrelation method may be used to find the optimal phase shifts $\varphi_k$ and $\varphi_l$ for $\tilde{F}_u$ and $\tilde{F}_v$, respectively. Finally, the phase shift of each metal-backed dielectric cuboids is determined as $\varphi_{k,l}=\varphi_k+\varphi_l$. FIG. 5 at (f) shows the pattern synthesized with the proposed product of two 1D beam patterns decomposition method. Although its main lobe level is slightly lower than the direct 2D synthesis, this novel 1D decomposition method has two advantages. First, a flatter main lobe is achieved thanks to the flat 1D patterns that are more easily synthesized. Second, the complexity of the optimization iteration is reduced from $O(N^2)$ to O(N) and fewer iterations are needed thanks to the fast convergence of the 1D optimization. To benchmark the complexity, both methods were on a PC with 16 GB memory and an Intel i7 CPU. For a millimirror 199 with 64×64 metal-backed dielectric cuboids, the decomposition method costs 3.8 milliseconds per optimization iteration and reaches the local minimum after 336 iterations, while the direct 2D synthesis costs about 31.5 s per iteration and does not reach the local minimum even after 1,000 iterations, so the novel 1D decomposition method is much more efficient when N becomes large.

In some embodiments, the thicknesses of the metal-backed dielectric cuboids may be determined using, as noted, a closed form-model of the metasurface (which is configured with the plurality of metal-backed dielectric cuboids). This closed form model is based on at least a phase error of each of the plurality of metal-backed dielectric cuboids, wherein each phase error maps to a thickness of each of the plurality of metal-backed dielectric cuboids, and wherein the closed-form model uses two-orthogonal one-dimensional representations of an objective reflective beam pattern.

The following describes experiments in a 3D electromagnetic field simulator to verify the correctness of the metasurface millimirror design and characterize the performance of the pattern synthesis method.

An evaluation using the 3D electromagnetic field simulator was performed to evaluate how the size of metasurface millimirror affects its beamforming gain. According to the conservation of the power in Equation (7), an ideal main lobe level of the metasurface millimirror is proportional to the area of the metasurface millimirror, assuming the incidence of a plane wave. Using metasurface millimirror surfaces with an area from 2×2 $cm^2$ to 8×8 $cm^2$ and objective reflection beam as (45°, 0°, 20°, 10°), FIG. 6 at (a) shows the increasing trend of the metasurface millimirror main lobe level matches that of the theoretical objective main lobe level following Equation (7). Thus, when a link requires an extra gain Ge, it can be achieved by simply scaling up the area of the millimirror by Ge.

Figure 6:
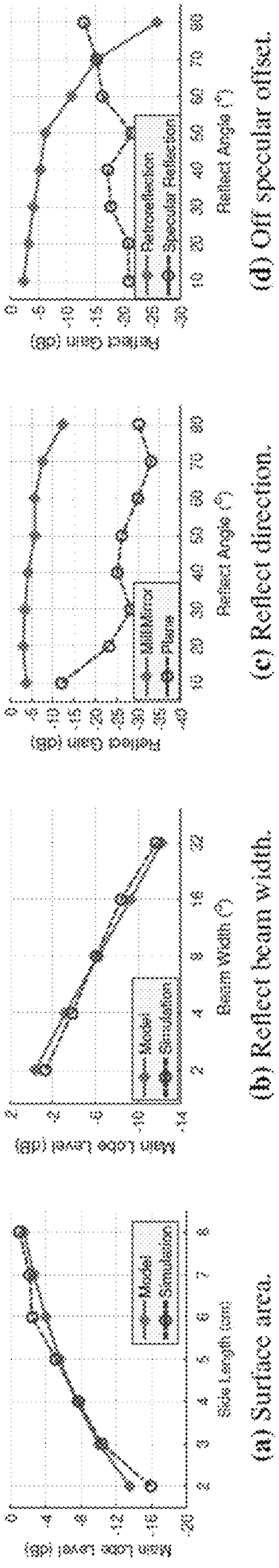
FIG. 6 depicts the simulated performance examples of the metasurface millimirror, in accordance with some embodiments.

An evaluation using the 3D electromagnetic field simulator was performed to evaluate the impact of beam width on the main lobe with different azimuth beam widths from 2° to 32°. FIG. 6 at (b) shows that the simulated millimirror's main lobe level decreases by about 3 dB as the beam width is doubled. The decreasing trend matches that of the maximum main lobe level $G_m$ of the objective beam pattern. That is, given a fixed total power, the main lobe level is halved as the main lobe region in the u-v coordinates doubles. The results indicates that $G_m$ can be used to accurately estimate the minimum size of the millimirror prior to running pattern synthesis.

Moreover, the reflection field of view (FoV) of the metal-backed dielectric cuboid 210 should be (or must) be narrower than half-space (180°). To benchmark the effective FoV of the millimirror's with metal-backed dielectric cuboids, the millimirror's is configured with reflection pencil beams that deviate from the broadside direction by 10° to 80°. As comparison, the reflect pattern of a plane with the same size and facing the broadside direction is also simulated in the 3D electromagnetic field simulator. While the reflect gain of the plane dramatically drops as the reflect angle deviates from the broadside direction, the metasurface millimirror consistently retains high reflect gain. FIG. 6 at (c) shows that the main lobe level of the millimirror only decreases by about 4 dB as the reflect angle increases to 70°. Therefore, the effective reflection FoV of the metal-backed dielectric cuboids should be around 140° (±70°) at 4 dB tolerance.

As noted above, the millimirror 199 may violate Snell's law of reflection and re-steers reflected signals to off-specular directions. To evaluate the millimirror's re-steering capability, an extreme case (e.g., retro reflection where the incident signal is reflected back to the source) is simulated using the 3D electromagnetic field simulator. For example, retroreflective mirrors are created with incident angles deviating from the broadside direction by 10° to 80°. FIG. 6 at (d) compares the reflect gain at the main lobe and specular reflection directions. With the increase of the reflect angle, the gain of retroreflection gradually drops while the specular reflection becomes stronger, mainly due to the limited FoV of the metal-backed dielectric cuboids. Given the 4 dB tolerance, the effective FoV of the millimirror's should be around 100° (±50°).

Figure 7:
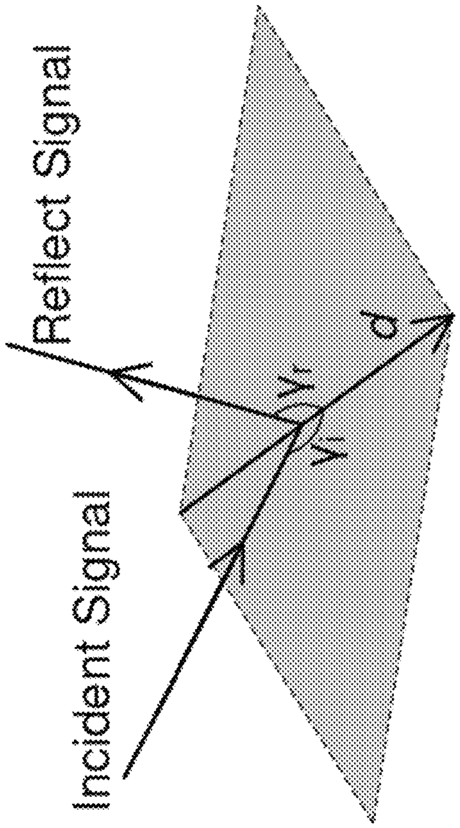
FIG. 7 depicts an example of the geometry associated with beam squinting, in accordance with some embodiments.

The basic model for the millimirror 199 noted above assumes a single working frequency point $f_0$. Although a target beam can always be formed with a millimirror having a sufficiently large surface, the actual beam pattern is distorted when the frequency of the incident signal deviates from the carrier frequency $f_0$ by design. This phenomenon, referred to as the beam squint effect, imposes a constraint on the maximum size of the surface for a given signal bandwidth, whereas the size constraint in turn limits the maximum signal power that can be reflected. The beam squint effect stems from the propagation delays of the signal incident at and reflected by different antennas. These propagation delays introduce phase delays that must be compensated by the array with different phase shifts in order to generate the objective reflective beam pattern. However, these phase delays vary inversely proportional to the signal wavelength, which cannot be fully compensated by the fixed phase shifts of the antennas. This mismatch causes the distortion of the beam pattern generated by the antenna array. The beam squint effect imposes a constraint to the size of the reflect array similar to traditional antenna arrays:

$$Bd < \frac{c}{|\cos\gamma_i + \cos\gamma_r|}, \tag{11}$$

wherein c is the light speed in free space; $\gamma_i$ is the angle between the incident signal; the maximum distance vector $\vec{d}$ connects the two points on the metasurface millimirror's surface (see, e.g., FIG. 7); $\gamma_r$ is the angle between the reflected signal and $\vec{d}$. Intuitively, this constraint ensures that the pair of furthermost elements on a surface has a phase error smaller than 180° at the two edges of the frequency band, i.e., $$f_0 \pm \frac{B}{2},$$

in order to avoid the destructive superimposition of the reflected signals. The beam squint problem disappears if the reflection beam points follow along the specular reflection direction of the surface, i.e., when $\gamma_i+\gamma_r$ approaches 180° for all pairs of points on the surface. But in practice, the objective beam direction cannot always be aligned with the specular reflection direction, due to possible mounting orientation constraints of the millimirror 199. Moreover, the specular reflection has very narrow beam width, which may not fulfil the objective patterns that require a wide beam.

Figure 9:
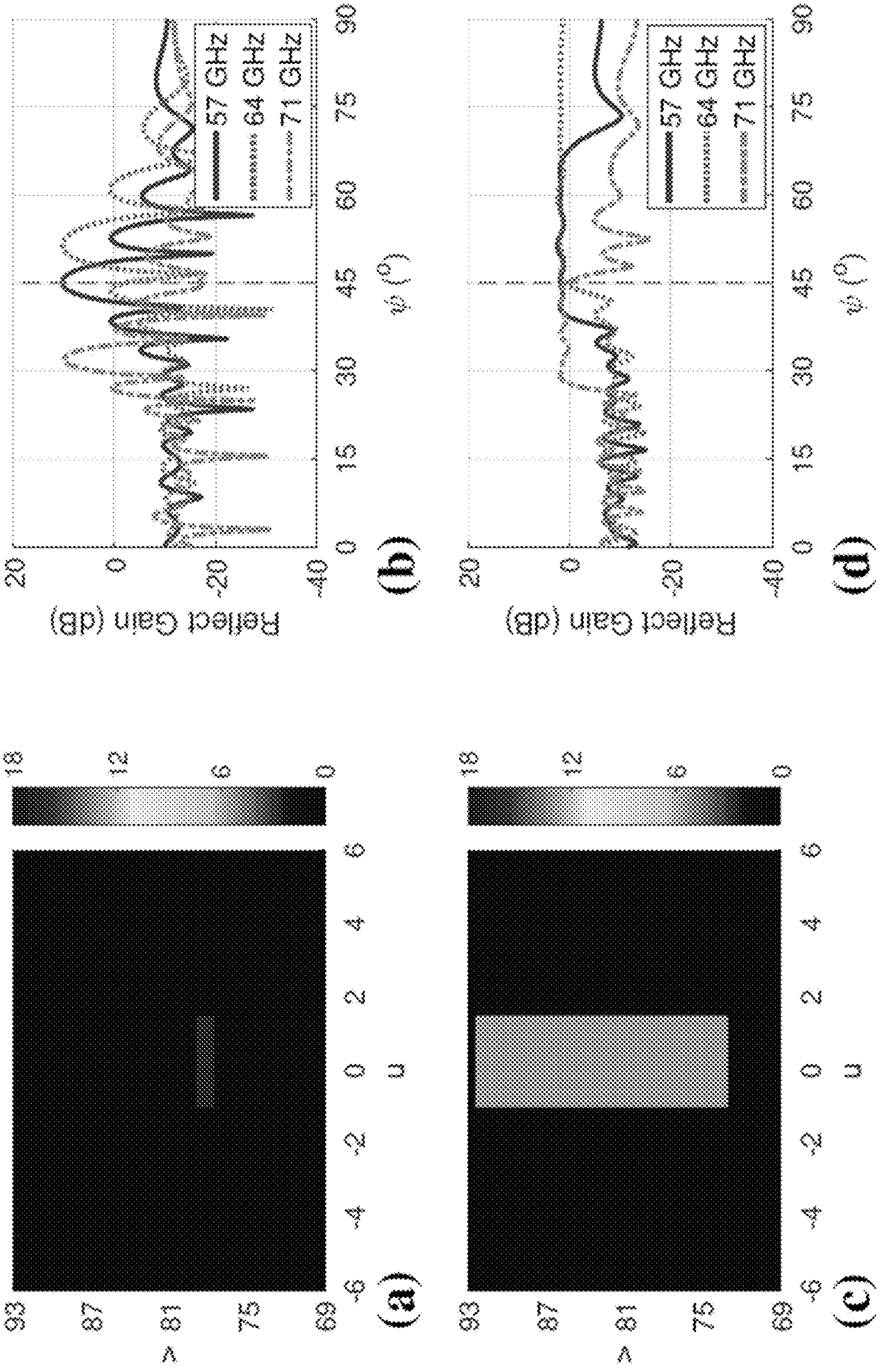
FIG. 9 depicts patterns associated with the metasurface millimirror, in accordance with some embodiments.

To better understand the impact of beam squinting, a WiGig network is used as an example. The latest WiGig standard specified up to 14 GHz working band (e.g., 57-71 GHz), supporting multiple channels (e.g., 2.16 GHz each). Suppose the incident direction $\phi_i=90°$, $\theta_i=0°$ and the reflection direction $\phi_r=90°$, $\theta_i=45°$, then $\gamma_i=90°$ and $\gamma_r=60°$. Following Equation (11), the diagonal length d must be smaller than 27.8 cm for one WiGig channel, and only 4.3 cm for the entire 14 GHz band. Electromagnetic simulation can show that the reflection gain of a single metal-backed dielectric cuboid with $w_d$=1.25 mm is around −58.9 dB, so the maximum reflection gain that is achievable by the metasurface millimirror with a narrowest pencil beam is around 29.0 dB for a single channel, and becomes only −3.5 dB for the entire 14 GHz WiGig band. Further simulation for a beam pattern with the main lobe region as (45°, 0°, 1°, 1°) for the metasurface millimirror with an area of 8×8 cm2 can be performed as shown at FIG. 9 at (a). There, the objective pattern at center frequency $f_0$=64 GHz is shown, while FIG. 9 at (b) shows the corresponding azimuth pattern. While the desired pencil beam is generated at 64 GHz, it shifts away at edge frequencies of the working band and leaves nulls as low as −17 dB at the target reflection direction. This would significantly limit the actual advantages of the metasurface millimirror.

Figure 8:
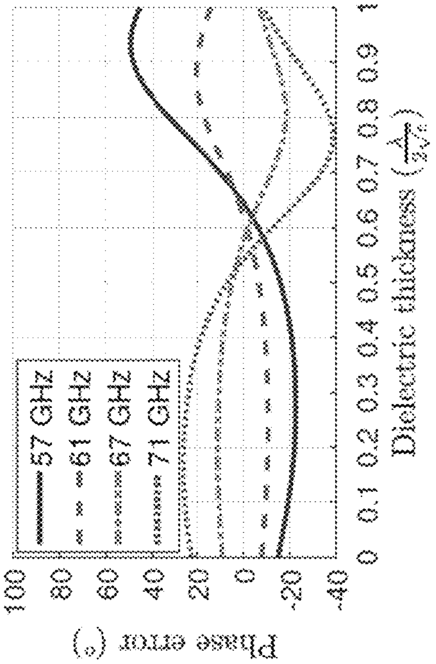
FIG. 8 depicts an example of phase errors associated with the metal-backed dielectric cuboid, in accordance with some embodiments.

To identify a cause of the beam squint effect to break the constraint in Equation (11), the reflection beam pattern (according to Equation (4)) of the millimirror 199 depends on for example three phase shifts, such as phase shift $\varphi_{k,l}$ caused by the metal-backed dielectric cuboids, phase shift $$\frac{2\pi}{\lambda}\vec{p}_{k,l}^{T}\vec{e}_i$$

caused by the incident signal, and phase shift $$\frac{2\pi}{\lambda}\vec{p}_{k,l}^{T}\vec{e}_r$$

caused by the reflection signal. On the one hand, the thickness of the metal-backed dielectric cuboids 210 is limited within half of the effective wavelength. The change of phase shift $\varphi_{k,l}$ across different frequencies is thus minor. For example, FIG. 8 shows the phase errors of the metal-backed dielectric cuboids 210 at the WiGig band. By setting the center frequency $f_0$=64 GHz, most phase errors are smaller than 20 degrees and the maximum error of 45 degree only occurs at the edge frequencies and a few thickness values. Thus, it is feasible to approximate the phase shifts $\varphi_{k,l}$ as constants within a working band. On the other hand, the phase shifts $$\frac{2\pi}{\lambda}\vec{p}_{k,l}^{T}\vec{e}_i \text{ and } \frac{2\pi}{\lambda}\vec{p}_{k,l}^{T}\vec{e}_r$$

can dramatically change with frequency, sinceπthey are proportional to the size of the metasurface millimirror.

Here, there is an opportunity to decouple the size and the bandwidth of the millimirror 199 and synthesize frequency independent objective reflective patterns. Let $$\hat{u} = \frac{Nw_d(\cos\phi_i\sin\theta_i + \cos\phi_r\sin\theta_r)}{\lambda} \text{ and}$$

$$\hat{v} = \frac{Nw_d\hat{(}\sin\phi_i\sin\theta_i + \sin\phi_r\sin\theta_r)}{\lambda},$$

the reflect pattern $F_{u,v}$ in Equation 6 may be transformed into $F_{u,v}$ as follows:

$$F_{\hat{u},\hat{v}} = \sum_{k,l=-N/2}^{N/2-1} e^{j\varphi_{k,l}} \cdot e^{j\frac{2\pi}{N}(k\hat{u}+l\hat{v})}. \tag{12}$$

At Equation (12), $F_{\hat{u},\hat{v}}$ is different from the $F_{u,v}$ in the sense that the optimization variables (e.g., $\varphi_{k,l}$) are independent from signal wavelength λ, which is embedded in the coordinates û and v̂. Given the transformed objective reflective pattern, the decomposition method noted above can be reused to find the frequency independent optimal phase shifts $\varphi_{k,l}$ for the metal-backed dielectric cuboids of the millimirror 199. However, the main lobe regions of different frequencies is now transformed to different regions in the û-v̂ coordinates, since û and v̂ are inversely proportional to the signal wavelength λ. To generate the objective main lobes at all frequencies, the main lobe region in the objective pattern $\tilde{F}_{\hat{u},\hat{v}}$ is set as the union of the main lobe regions of all frequencies in the desired working band. The pattern synthesized according to $\tilde{F}_{\hat{u},\hat{v}}$ will generate consistently strong reflection signals covering the objective main lobe region across the bandwidth. Now that the power of the main beam is distributed over a wide region, the absolute main lobe level will be inevitably reduced compared with the single carrier case. FIG. 9 at (c) shows the frequency independent objective pattern, and the corresponding azimuth pattern is shown in FIG. 9 at (d). The metasurface millimirror achieves a consistent reflection gain of 1 dB across the entire 57-71 GHz band. While $\tilde{F}_{\hat{u},\hat{v}}$^ has a larger main lobe region and thus the reflection gain becomes weaker, the size of the metasurface millimirror may be increased to compensate this loss, thanks to the key advantage of $\tilde{F}_{\hat{u},\hat{v}}$^ in decoupling the size and the bandwidth. Specifically, according to the conservation of the energy in Eq. 7, by doubling the size of metasurface millimirror, the reflection gain increases by 10 log $10(2^2)$=6 dB.

The following illustrates an example of a fabrication process. Although a variety of fabrication processes may be used for the millimirror 199, the following describes a 3D printing process-based method to fabricate the dielectric 212 portion of the millimirror 199. And, a metal film may be coated on the back side of the 3D printed dielectric part. The following further describes aspects of the fabrication process.

Figure 10:
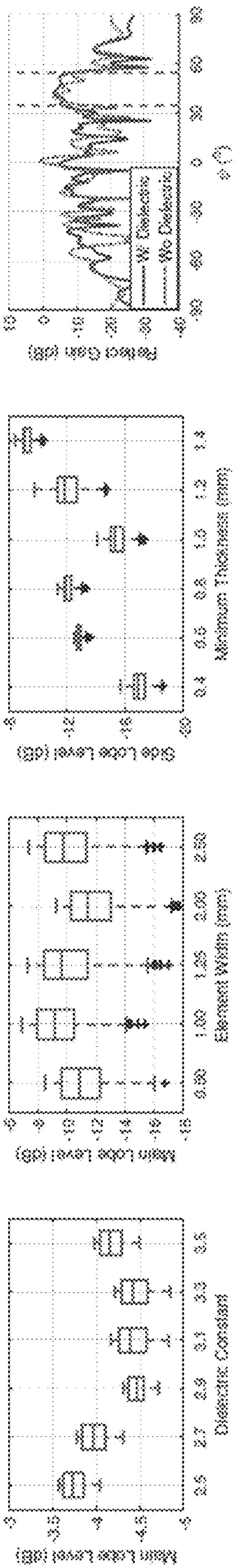
FIG. 10 depicts examples of parameters used in making the metasurface millimirror, in accordance with some embodiments.

The surface impedance of the metal-backed dielectric cuboids 210 depends at least on the dielectric constant (∈) of the material. However, most the off-the-shelf 3D printing materials only specify ∈ at very low frequencies, such as below 1 kHz. Nonetheless, it is known that the dielectric constant decreases with frequency. Through a simple linear extrapolation of manufacture specifies values, we speculate that the dielectric constant of most 3D printing material are around 2.5-3.5 at common RF frequencies. To evaluate the impact of an inaccurate dielectric constant, a pencil beam pattern is synthesized for the 4×4 $cm^2$ millimirror 199 that assumes a dielectric constant of 2.5, and an electromagnetic field simulator is used to simulate its pattern with the dielectric constant selected from the set of 2.5 and 3.5. FIG. 10 at (a) shows that the main lobe level of the beam decreases slightly as the error of the dielectric constant increases. This indicates the millimirror 199 may be reliably fabricated even with an approximate dielectric constant.

Figure 11:
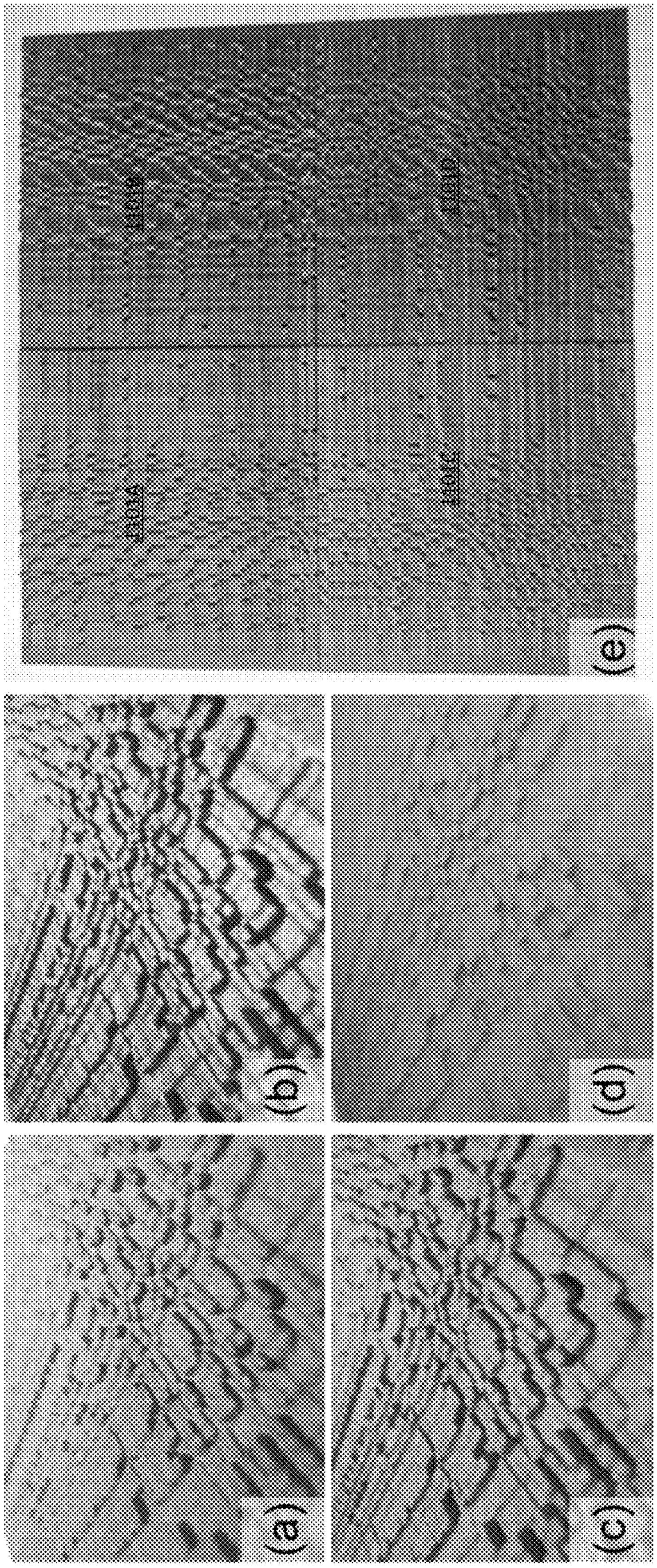
FIG. 11 depicts examples of the surface aspects during the making of the metasurface millimirror, in accordance with some embodiments.

To select suitable dielectric material for the metasurface millimirror, samples may be fabricated with a variety of printing materials, such as HP PA 12, VisiJet M3, and StratasSys Vero-Clear. The samples made from HP PA 12 have the highest elongation at break and the lowest extension of warping, which is the most suitable for the follow-on metal deposition steps. Some of the examples referred to herein use HP PA 12 as the printing material for the millimirror, an example of which is depicted at FIG. 11 at (a). Referring to FIG. 11 at (a), it shows the metal-backed dielectric cuboids made with the HP PA 12. In this example, the dielectrics constant is about 2.55 at 50 Hz-75 GHz. Moreover, in the case where the dielectric is a polymer for example, the dielectric constant may vary between 2-10, while a ceramic may be have a dielectric constant between 10-50. Although the previous example refers to HP PA 12, other types of dielectric compositions may be used as well. For example, compositions, such as ceramic, glass, plastic, mica, and/or the like, are considered dielectrics. In the case of for the range of dielectric constant, printing polymer can be from 2-10, and ceramic can be 10-50.

The width $w_d$ of the metal-backed dielectric cuboids is another parameter to be determined before fabrication. To evaluate its impact, a simulation is performed for a 4×4 $cm^2$ millimirror 199 with $w_d$ ranging from 0.8 mm to 2.5 mm. The objective reflective pattern has a fan beam of (45°, 0°, 10°, or 10°). FIG. 10 at (b) shows that different element widths only have minor impact on the main lobe level. Nonetheless, some of the examples disclosed herein were fabricated using a $w_d$=1.25 mm. This width was selected for two reasons. On one hand, $w_d$ should be as large as possible to reduce the impact of the quantization errors of 3D printing and to make the back side of the millimirror 199 less rugged and easier to coat metal. On the other hand, $w_d$ must be smaller than $$\frac{\lambda}{4}$$

to avoid aliasing of the Fourier transform in Equation (12). Specifically, according to the definition of Fourier transform, the indices û and v̂ must be within $$\left[-\frac{N}{2}, \frac{N}{2}\right).$$

Since both the coefficient cos $\varphi_i$ sin $\theta_i$+cos $\varphi_r$ sin $\theta_r$ and sin $\varphi_i$ sin $\theta_i$+sin $\varphi_r$ sin $\theta_r$ have a maximum value of 2, the element width $w_d$ must be smaller than $$\frac{\lambda}{4}.$$

For the WiGig frequency band for example, the $w_d$ may thus be around 1.25 mm.

To ensure structure strength, 3D printing usually has a requirement of a minimum thickness of the sample, denoted as $\delta_t$. For example, HP PA 12 requires a minimum thickness of 0.4 mm. For the millimirror 199, this can be achieved by shifting the range of the dielectric cuboid thickness by a $\delta_t$ constant to $$\left[\delta_t, \delta_t + \frac{\lambda}{2\sqrt{\epsilon}}\right].$$

To evaluate the impact of $\delta_t$, the millimirror with $\delta_t$€[0.4, 1.4] mm is simulated. FIG. 10 at (c) shows that the side lobe level at the specular reflection direction dramatically increases with thicker dielectric cuboids. A reason is that a thicker dielectric entails the signal to travel a longer distance within the metasurface millimirror, which magnifies the mismatch between the theoretical and simulated models of the metasurface millimirror. This mismatch distorts the pattern by creating a strong side lobe towards the specular reflection direction. Thus, we set the minimum thickness to be 0.4 mm.

The metal-backed dielectric cuboids of the millimirror 199 may include, as noted, a dielectric cuboid and a metal layer as depicted at FIG. 2A at (a). An alternative element design is to remove the dielectric cuboid and assume a virtual vacuum cuboid with a dielectric consent of 1. All elements can be connected via a common metal base and each element is simply a vacuum groove (VG). For example, the millimirror may be simulated with the two types of unit elements where ψi=0°, €i=0°, and the objective pattern is a fan beam of 45°, 0°, 20°, and 10°. FIG. 10 at (d) shows the azimuth patterns of the two structures. The side lobe level of the vacuum groove at the specular reflection direction is even larger than the main lobe level, indicating significant mismatch between its theoretical and simulated models. The mismatch likely stems from the larger depth of the vacuum groove compared with the thickness of the metal-backed dielectric cuboids, which introduces larger phase errors and thus stronger specular reflection In addition, when the dielectric cuboid is used instead of the vacuum groove, the illumination area of all elements is increased thanks to the refraction effect of the dielectric material, and the mismatch is thus reduced. This further signifies the need of using metal-backed dielectric cuboids as the unit element in millimirror.

The metasurface millimirror's metal film should be configured to block the transmission of the incident signal and maximize the reflection signal, so the thickness of the metal film should be configured so that it is at least several times of the skin depth (defined as the depth up to which the magnetic field penetrates inside the material) of the metal. For example, the skin depths of copper at 60 GHz and 1 GHz are about 266.2 nm and 2.06 μm, according to the approximate model $$\frac{1}{\pi f \mu \sigma},$$

where σ and μ are the conductivity and permeability of the metal, respectively. Further considering the erosion and oxidization of the metal, we set the thickness of the metal fil as 15 μm.

Metal deposition techniques include physical and chemical deposition. Physical deposition directly deposits metal atoms on the target surface. The metal atoms are generated by either colliding the solid source metal with accelerating gas ions or heating the metal past its sublimation temperature. Physical deposition has no special requirements on the material of the target sample. However, it is time consuming due to the slow deposition rate (normally lower than 1 μm/h) and requires expensive vacuum equipment (which further reduces efficiency due to vacating/venting requirements). In contrast, chemical deposition employs Redox reactions, which transfer the desired metal coating from an anode (containing the metal material) to a cathode (i.e., the target sample to be coated) in a chemical bath solution. Electroless plating and electroplating are two main categories of chemical deposition. Electroless plating can be conducted on any substrate, but the deposition rate is slow. Although a variety of deposition techniques may be used for the millimirror 199 fabrication, electroplating may be preferable as it is relatively low-cost and fast. But it is only applicable on conductive surfaces. To meet this constraint, a physical coating process is applied on the dielectric substrate, and then a copper film is deposited through electroplating.

The physical coating process may be realized by either sputtering or thermal evaporation. Although either coating process can be used, the examples herein used sputtering as the resulting metal layer is smoother and has higher conductivity. Specifically, a 10 nm chromium (Cr) layer is sputtered to increase bonding strength between the metal layer and the dielectric layer. Then a 300 nm copper layer is sputtered on top as the conductive layer for further electroplating process. FIG. 11 at (b) shows the sample after sputtering. Afterwards, the electroplating process is performed, where in the anode and cathode are placed in an electrolyte chemical bath and exposed to a continuous electrical charge. For example, an electrochemical bath solution containing 74.88 g $CuSO_4$ $5H_2O$, 67.524 mL 98 wt. % $H_2SO_4$, 1173 mL deionized water, 0.327 g NaCl, and 1.876 g Polyethylene Glycol (Mw=3350) is prepared. This compost solution can be used to deposit metal on 8 samples of 10×10 $cm^2$ and scaled for the metasurface millimirror with different sizes. Then, the sputtered dielectric surface and a copper plate are put into the solution, separated 8 cm apart, and face right towards each other. The surface current is generated by a Keithley 2400 electrometer, with current density set to 7 $mA/cm^2$ for 60 min to generate a 15 μm copper layer. The thickness is tunable with deposition time and current density. The sample after electroplating is shown in FIG. 11 at (C). Finally, the metal film is sealed with an encapsulation polymer (e.g., EcoFlex) to mitigate the oxidization of copper, as shown in FIG. 11 at (d). FIG. 11 at E shows 4 samples 1101A-D spliced together to form a larger metasurface millimirror.

Although natural reflector such as building walls can create non line of sight paths for millimeter wave, they are highly opportunistic and impacted orientation and material. For example, smooth concrete reflects signals strongly but only specularly, whereas textured concrete and/or brick results in significant scattering and attenuation. The metasurface millimirror may serve as an artificial reflector to overcome these limitations. The metasurface millimirror 199 deployment can follow for example the standard practice of cellular network planning. For example, candidate mounting positions of the metasurface millimirror can be identified by searching for the suitable mounting structures, such as walls, traffic lights, and/or other structures or surfaces. Given the location of a base station for example, the mounting location and orientation of the metasurface millimirror (as well as the blind spot region), the objective reflective beam pattern of the metasurface millimirror in the polar coordinates can be determined by projecting the blind spot region to the unit sphere centering at the metasurface millimirror. The minimum size of the metasurface millimirror can be estimated prior to the pattern synthesis process, given the link budget and the metasurface millimirror mounting position. Suppose for example the millimirror 199 comprises an N×N array of metal-backed dielectric cuboid whose reflect gain is $\sigma_0$, the main lobe region of the objective reflective beam pattern occupies A out of $N^2$ points in the entire u-v space. The objective main lobe level Gm can be obtained by evenly distributing the power across the A points, e.g., $$Gm = \frac{N^2 \sigma_D}{A}.$$

Along the deterministic transmit metasurface millimirror receive path, the minimum receive (Rx) power follows the Friis law:

$$P_r = \frac{\dot{P}_t G_t G_r \lambda^2 G_m}{(4\pi)^3 d_t^2 d_r^2},$$

wherein $P_r$, $G_t$, $G_r$ are the Tx power, Tx gain, and Rx gain are known based on the Tx/Rx specs. The $d_t$ and $d_r$ are the distance between the Tx (Rx) and the metasurface millimirror. Since all these parameters are available and known when the mounting location and orientation of the metasurface millimirror, the required size of the metasurface millimirror may be determined as:

$$N = \sqrt{\frac{(4\pi)^3 d_t^2 d_r^2 A}{P_t G_t G_r \lambda^2 \sigma_D}}.$$

As noted, the millimirror 199 is a fully passive device and can operate transparently to standard millimeter wave radios. The standard beam searching process, such as in 802.11ad and 5G NR, all require that the BS and/or user equipment client periodically scan a set of beams, and the beam with highest RSS is picked to establish the link. With the metasurface millimirror, the BS and/or user equipment may automatically find it optimal to point towards the metasurface millimirror as it establishes the only or the best non line of sight path.

As noted above, a plurality of millimirrors 199 may be distributed in various locations in a region to enhance the coverage of at least one base station, such as base station 109 and the like.

Figure 12:
FIG. 12 depicts an implementation using distributed millimirrors, in accordance with some embodiments.

In this way, the millimirrors 199 may expand the coverage area of fixed wireless access points, such as base stations. In the case of mobile user equipment, millimirror deployment may illuminating a target mobility region through a wide-angle fan-beam in both azimuth and elevation. Due to the reciprocal nature of passive beamforming, a user equipment located within the fan-beam's coverage will redirect its uplink signals to a corresponding base station through the millimirror. FIG. 12 depicts an example deployment of 6 millimirrors 1202A-F (the arrows indicate the direction the front side of the multimirror is pointing) and two base station 1210A-B. In this example, a user equipment 1215 is mobile and traverses along a path 1220. The use of the millimirrors 1202A can enhance the coverage of the base stations towards the user equipment 1215, and as noted, the radio protocols of the base stations and user equipment do not have to be modified in order to take advantage of the coverage area enhancement provided by the millimirrors. In the example of FIG. 12, the plurality of millimirror apparatus are located in a far field of at least one base station (e.g., base stations 1210A-1210B) to reflect a plurality of millimeter wave beams (which are emanated by the base station(s) towards at least one user equipment (e.g., user equipment 1215) to improve coverage area associated with the at least one base station. In the example of FIG. 12, a plurality metasurfaces may be deployed for reflecting at least one millimeter wave beam, wherein the metasurface is configured with a plurality of metal-backed dielectric cuboids, wherein each of the metal-backed dielectric cuboids comprise a dielectric material having a first surface of the dielectric material and an opposite, second surface of the dielectric material, wherein the first surface of the dielectric material is in a same plane as the second surface of the dielectric material, wherein the dielectric material comprises a cuboid defined at least by a width and a thickness, and a metal layer having a first surface of the metal layer and an opposite second surface of the metal layer, wherein the second surface of the dielectric material is disposed on the first surface of the metal layer. The millimirrors may reflect at least one millimeter wave beam from a cellular base station towards a user equipment.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed:

1. An apparatus for reflecting at least one millimeter wave beam comprising:

a metasurface configured with a plurality of metal-backed dielectric cuboids, wherein each of the metal-backed dielectric cuboids comprise:

a dielectric material having a first surface of the dielectric material and an opposite, second surface of the dielectric material, wherein the first surface of the dielectric material is in a same plane as the second surface of the dielectric material, wherein the dielectric material comprises a cuboid defined at least by a width and a thickness, and a metal layer having a first surface of the metal layer and an opposite second surface of the metal layer, wherein the second surface of the dielectric material is disposed on the first surface of the metal layer.

2. The apparatus of claim 1, wherein the thickness of the metal-backed dielectric cuboid is in a range of 0.4 millimeters to 4.3 millimeters.

3. The apparatus of claim 2, wherein the thickness configures an amount of phase shift provided by the metal-backed dielectric cuboid to at least one millimeter wave beam incident on the first surface of the of the dielectric material.

4. The apparatus of claim 1, wherein the width of the metal-backed dielectric cuboid is in a range of 0.9 millimeters to 3.1 millimeters.

5. The apparatus of claim 1, wherein at least one millimeter wave beam is received from a cellular base station and reflected, by the apparatus, towards a user equipment.

6. The apparatus of claim 1, wherein the first surface of the metal layer and the second surface of the metal layer are flat.

7. The apparatus of claim 1, wherein the metasurface comprising the first surface of the metal layer and the second surface of the metal layer are flat.

8. The apparatus of claim 1, wherein the metasurface comprising the first surface of the dielectric material is configured with different thicknesses to provide different phase shifts to generate a reflected output beam pattern.

9. The apparatus of claim 1, wherein the apparatus is located in a far field of at least one base station transmitting towards at least one user equipment to reflect at least one millimeter wave beam.

10. The apparatus of claim 1, wherein a plurality of apparatus are located in a far field of at least one base station to each reflect at least one millimeter wave beams towards at least one user equipment to improve coverage area associated with at least one base station.

11. The apparatus of claim 1, wherein the thickness of the dielectric material is determined based on a phase shift, wherein the phase shift is determined before manufacture of the apparatus using a closed-form model that solves for an objective reflective beam pattern.

12. The apparatus of claim 1, wherein the thickness configures an amount of phase shift provided to at least one millimeter wave beam incident on the first surface of the dielectric material.

13. The apparatus of claim 1, wherein the second surface of the dielectric material is disposed on a bonding layer that is disposed on the first surface of the metal layer.

14. The apparatus of claim 13, wherein the bonding layer comprises a chromium layer.

15. The apparatus of claim 1, wherein the metal-backed dielectric cuboids comprises square faces and/or rectangular faces.

16. The apparatus of claim 1, wherein the thickness of a cuboid is determined using a closed form-model of the metasurface configured with the plurality of metal-backed dielectric cuboids, the closed-form model based on a phase error of each of the plurality of metal-backed dielectric cuboids, wherein each phase error maps to a thickness of each of the plurality of metal-backed dielectric cuboids.

17. The apparatus of claim 16, wherein the closed-form model uses two-orthogonal one-dimensional representations of an objective reflective beam pattern.

18. The apparatus of claim 1, wherein at least a portion of the metasurface is manufactured using a printing technology.

19. A method comprising:

distributing a plurality metasurfaces for reflecting at least one millimeter wave beam, wherein the metasurface is configured with a plurality of metal-backed dielectric cuboids, wherein each of the metal-backed dielectric cuboids comprise a dielectric material having a first surface of the dielectric material and an opposite, second surface of the dielectric material, wherein the first surface of the dielectric material is in a same plane as the second surface of the dielectric material, wherein the dielectric material comprises a cuboid defined at least by a width and a thickness, and a metal layer having a first surface of the metal layer and an opposite second surface of the metal layer, wherein the second surface of the dielectric material is disposed on the first surface of the metal layer; and reflecting, by at least one of the plurality of metasurfaces, at least one millimeter wave beam from a cellular base station towards a user equipment.

* * * * *